United States Patent
Galvanauskas

(10) Patent No.: US 9,865,986 B2
(45) Date of Patent: Jan. 9, 2018

(54) COHERENT COMBINING PULSE BURSTS IN TIME DOMAIN

(71) Applicant: THE REGENTS OF THE UNIVERSITY OF MICHIGAN, Ann Arbor, MI (US)

(72) Inventor: Almantas Galvanauskas, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 0 days.

(21) Appl. No.: 15/104,924

(22) PCT Filed: Dec. 19, 2014

(86) PCT No.: PCT/US2014/071585
§ 371 (c)(1),
(2) Date: Jun. 15, 2016

(87) PCT Pub. No.: WO2015/095751
PCT Pub. Date: Jun. 25, 2015

(65) Prior Publication Data
US 2016/0315441 A1    Oct. 27, 2016

Related U.S. Application Data

(60) Provisional application No. 61/918,485, filed on Dec. 19, 2013.

(51) Int. Cl.
*H01S 3/23*     (2006.01)
*H01S 3/106*    (2006.01)
(Continued)

(52) U.S. Cl.
CPC ............ *H01S 3/1062* (2013.01); *H01S 3/005* (2013.01); *H01S 3/1307* (2013.01); *H01S 3/23* (2013.01);
(Continued)

(58) Field of Classification Search
CPC ....... H01S 3/005; H01S 3/0057; H01S 3/2383
See application file for complete search history.

(56) References Cited

U.S. PATENT DOCUMENTS 9,166,355 B2 *  10/2015  Messerly ............ H01S 3/06758
2005/0232182 A1  10/2005  Shattil
(Continued)

FOREIGN PATENT DOCUMENTS

WO    WO-2013188349 A2    12/2013

OTHER PUBLICATIONS

International Search Report and Written Opinion for PCT/US2014/071585, dated Apr. 22, 2015; ISA/KR.

*Primary Examiner* — Michael Carter
(74) *Attorney, Agent, or Firm* — Harness, Dickey & Pierce, P.L.C.

(57) ABSTRACT

A beam combining and pulse stacking technique is provided that enhances laser pulse energy by coherent stacking pulse bursts (i.e. non-periodic pulsed signals) in time domain. This energy enhancement is achieved by using various configurations of Fabry-Perot, Gires-Tournois and other types of resonant cavities, so that a multiple-pulse burst incident at either a single input or multiple inputs of the system produces an output with a solitary pulse, which contains the summed energy of the incident multiple pulses from all beams. This disclosure provides a substantial improvement over conventional coherent-combining methods in that it achieves very high pulse energies using a relatively small number of combined laser systems, thus providing with (Continued)

orders of magnitude reduction in system size, complexity, and cost compared to current combining approaches.

18 Claims, 22 Drawing Sheets

(51) Int. Cl.
 *H01S 3/13* (2006.01)
 *H01S 3/00* (2006.01)
 *G02B 27/10* (2006.01)

(52) U.S. Cl.
 CPC .......... *H01S 3/2308* (2013.01); *H01S 3/2383* (2013.01); *G02B 27/1006* (2013.01)

(56) References Cited

U.S. PATENT DOCUMENTS

| | | |
|---|---|---|
| 2005/0232317 A1 | 10/2005 | Dantus et al. |
| 2007/0280398 A1 | 12/2007 | Dardik et al. |
| 2009/0161034 A1 | 6/2009 | Coates et al. |
| 2013/0148128 A1 | 6/2013 | Fermann et al. |

* cited by examiner

COHERENT COMBINING PULSE BURSTS IN TIME DOMAIN

CROSS-REFERENCE TO RELATED APPLICATIONS

This application claims the benefit of U.S. Provisional Application No. 61/918,485, filed on Dec. 19, 2013. The entire disclosure of the above application is incorporated herein by reference.

GOVERNMENT CLAUSE

This invention was made with government support under Grant No. DE-SC0006377 awarded by the U.S. Department of Energy, and N6601-11-1-4208 awarded by the U.S. Defense Advanced Research Projects Agency. The government has certain rights in this invention.

FIELD

The present disclosure relates to lasers and more specifically to coherent combining of multiple laser beams and temporal pulse stacking to increase pulse energy.

BACKGROUND

In general, beam combining of multiple lasers allows overcoming power and energy limitations of each individual laser. Beam combining of multiple laser signals can be currently achieved using a variety of methods such as active coherent phasing, incoherent spectral combining, passive self-locked combining, or incoherent spatial addition of multiple laser beams. In each of these methods, each parallel laser channel generates an identical signal and all parallel output signals are then combined with the total combined power proportional to the sum of individual powers from all N laser channels. The maximum achievable power can never exceed this total sum, as fundamentally limited by the power conservation law. These beam combining methods can be applied to continuous wave signals as well as pulsed signals. When these currently used methods are used to combine pulsed beams, the combined energy per each pulse can never exceed the sum of individual pulse energies from all the channels.

In case of pulsed signals, it is possible to achieve simultaneous pulse combining and time-domain energy redistribution such that in a combined beam pulse repetition rate is reduced and, therefore, combined energy per pulse now increases proportionally to both this repetition rate decrease and to the total sum of individual pulses from all the channels. This increases combined pulse energy faster than a linear proportionality to a number of parallel channels N. As described in applicant's previous work, this increase could be proportional to $N^2$ of the number of channels, thus significantly reducing combined laser array size and complexity for reaching the same combined pulse energy as with the above-described methods. Further details regarding this previous work can be found, for example in U.S. patent application Ser. No. 14/403,038 which is incorporated in its entirety herein. The technique described in this previous work is applicable only to periodically pulsed signals. Redistribution of energy between the pulses in time domain requires that a beam-combining element would provide a time delay longer than the time duration over which pulse energy is redistributed. This time delay is always associated with the size of the combining element. For example, in the $N^2$ combining method described in applicant's previous work, a Fabry-Perot or any other configuration of a resonant cavity can be used, with its round-trip length $L=c \cdot \Delta T$, where $\Delta T$ is the each-channel periodic-signal repetition period, as shown in FIG. 1. This means that pulse repetition rate at the input of the system has to be high, in order to be compatible with a practically short length of the combining cavity. This means that achieving high energy at high repetition rates is associated with impractically high average powers. For example, a 3 m long roundtrip cavity corresponds to 100 MHz repetition rate of the periodic pulse input. Assuming that each pulse in the input periodic signal is at about 1 mJ of energy (expected energy of ~1 ns pulse at the maximum of each parallel amplification channel), then the average power per each amplified beam from each parallel channel is approximately 100 kW.

This section provides background information related to the present disclosure which is not necessarily prior art.

SUMMARY

This section provides a general summary of the disclosure, and is not a comprehensive disclosure of its full scope or all of its features.

In one aspect, a method is provided for coherently combining pulses of a pulsed optical signal in the time domain. The method includes: receiving an optical input signal comprised of a periodic pulse train; splitting the input signal into two optical signals; forming at least one cluster of pulses in each of the two optical signals, where amplitude and phase of pulses in each cluster varies amongst pulses; and coherently combining the two optical signals in the time domain using a resonant cavity and thereby forming an optical output signal having a solitary pulse for each cluster of pulses, where the two optical signals are combined in a manner such that pulse energy of the solidary pulse exceeds N times highest energy of any given pulse in the cluster of pulses from the two optical signals.

Clusters of pulses may be formed by amplitude modulating and phase modulating the two optical signals. In particular, the clusters of pulses in the two optical signals are formed complementary with each other in the spectral domain. The two optical signals may be combined using a Fabry-Perot interferometer.

This method may be extended to coherently combine pulses from N optical signals. The method includes: receiving an optical input signal comprised of a periodic pulse train; splitting the input signal into N optical signals; amplitude modulating each signal in the N optical signals to form clusters of pulses in each signal, such that amplitude of pulses in each cluster varies amongst pulses; phase modulating each signal in the N optical signals, such that phase of pulses in each cluster varies amongst pulses; and coherently combining each of the phase modulated signals in the time domain using one or more resonant cavities and thereby forming an optical output signal having a solitary pulse for each cluster of pulses, where the N optical signals are combined in a manner such that pulse energy of the solidary pulse exceeds N times highest energy of any given pulse in the cluster of pulses from the N optical signals.

Prior to coherently combining the phase modulated signals, each of the phase modulated signals may be amplified. Additionally, the N optical signal can be phase locked.

In some embodiments, the phase modulated signals are coherently combined using a plurality of Fabry-Perot interferometer cavities arranged in either a parallel cascading manner or a sequential cascading manner.

In another aspect of this disclosure, a method is provided for coherently combining (or stacking) pulses from a single optical signal in the time domain. The method includes: receiving an optical input signal comprised of a periodic pulse train; forming at least one cluster of pulses in the pulse train, where amplitude and phase of pulses in the at least one cluster varies amongst pulses; and coherently combining pulses in the at least one cluster in the time domain to form an optical signal with a solitary pulse using a resonant cavity, where the resonant cavity has an entirely reflective cavity. The resonant cavity may be further defined as a Gires-Tournois interferometer cavity.

Pulse energy can be further increased through the use of N parallel channel amplification array. This method includes: receiving an optical input signal comprised of a periodic pulse train; amplitude modulating the optical input signal to form at least one clusters of pulses, such that amplitude of pulses in each cluster varies amongst pulses; phase modulating the optical input signal, such that phase of pulses in each cluster varies amongst pulses; splitting the optical input signal into N optical signals; amplifying each of the N optical signals; coherently combining each of the amplified optical signals into a combined signal using a beam combiner; and coherently combining pulses in the at least one cluster of pulses in the combined signal in the time domain using a resonant cavity having an entirely reflective cavity, thereby forming an optical output signal having a solitary pulse for each cluster of pulses.

Pulses from the pulse clusters can be coherently combined using a Gires-Tournois interferometer. In some embodiments, N Gires-Tournois interferometers can be arranged in a sequential cascading manner, such that the energy increase of a solitary pulse is approximately 2N. In other embodiments, Gires-Tournois interferometers can be arranged in two or more sequential stages, where each stage includes N Gires-Tournois interferometers arranged in a sequential cascading manner and the Gires-Tournois interferometer in each subsequent cascade are of equal roundtrip length, which is at least 2N times longer than in the previous cascade.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Instead of dealing with periodic signals, this disclosure presents beam combining and pulse stacking (in time domain) of solitary pulse bursts. This approach allows decoupling of the resonant cavity length from the pulse repetition rate, since this cavity length now determines pulse repetition rate within the solitary pulse burst, while repetition rate between these solitary pulse bursts is completely unconstrained by the combiner size, and, therefore, can be selected completely arbitrarily.

Figure 1:
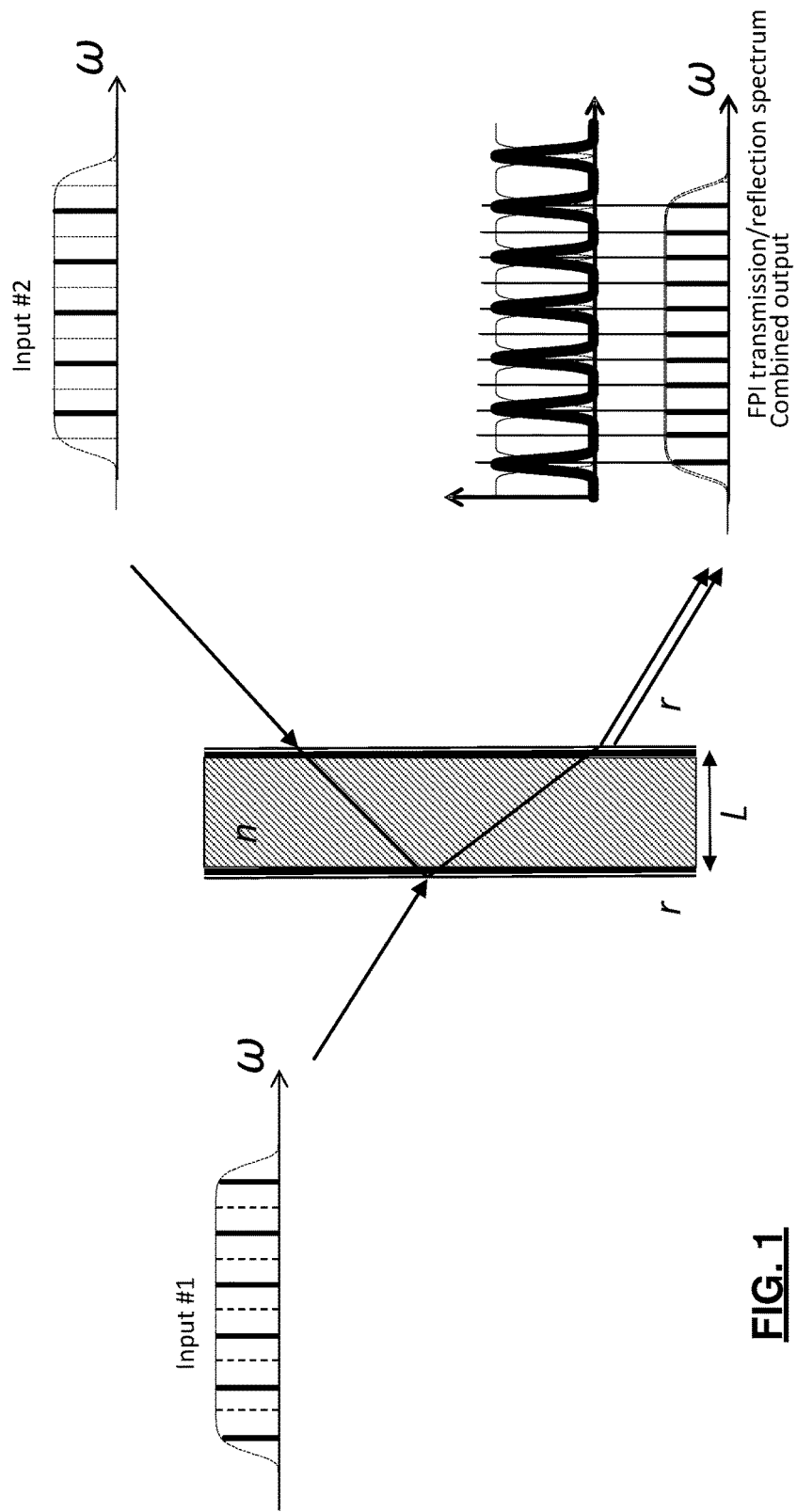
FIG. 1 is a diagram illustrating a conventional beam combining technique.
Figure 2:
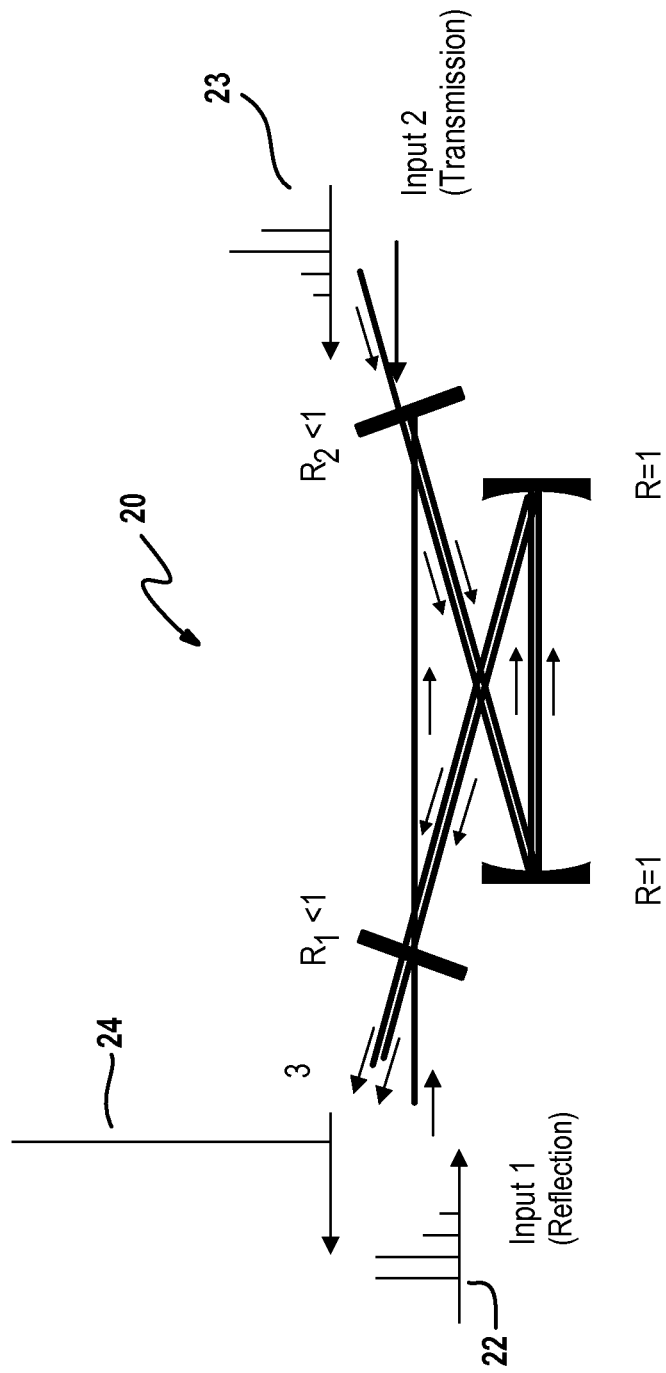
FIG. 2 is a diagram illustrating a coherent beam combining and pulse stacking technique.

FIG. 2 illustrates the beam combining and pulse stacking technique using a resonant cavity 20 with two input beams, one beam 22 configured to be reflected and the other beam 23 transmitted by the cavity. The resonant cavity 20 is characterized by the fact that the two end mirrors defining it's cavity are each partially reflecting (i.e. each of their reflectivity is less than 100%). In an example embodiment, the resonant cavity 20 is further defined as a Fabry-Perot Interferometer cavity. Other types of resonant cavities are also contemplated by this disclosure.

The concept is best illustrated by considering this resonant cavity combiner 20 in reverse. That is, if a solitary pulse 24 is incident into the resonant cavity 20, it will split into two beams, one corresponding to a reflection-port input 26, another to a transmission-port input 27. This "reversed"

pulse now will produce a time-decaying burst of pulses in each of the two beams. In general, each pulse in each of the bursts is characterized by pulses of varying amplitude and phase, which can be easily calculated. Pulse repetition rate in each of the burst will be identical and equal to the RC combiner round-trip time. Consequently, if the "reversed" sequence of each of the pulse bursts is produced for the input reflection and transmission channels (which includes reversing the order of the pulses and replicating correct amplitudes and phases for each of the pulse in the sequence), then a single beam is produced at the output of the RC combiner with all the pulses stacked in time domain, such that a solitary pulse containing the total energy obtained by summing-up all individual pulse energies from each of the two incident pulse bursts. It can be shown that this pulse energy enhancement with respect to each individual pulse in each of the two input pulse clusters will be larger than the number of channels.

Figure 3:
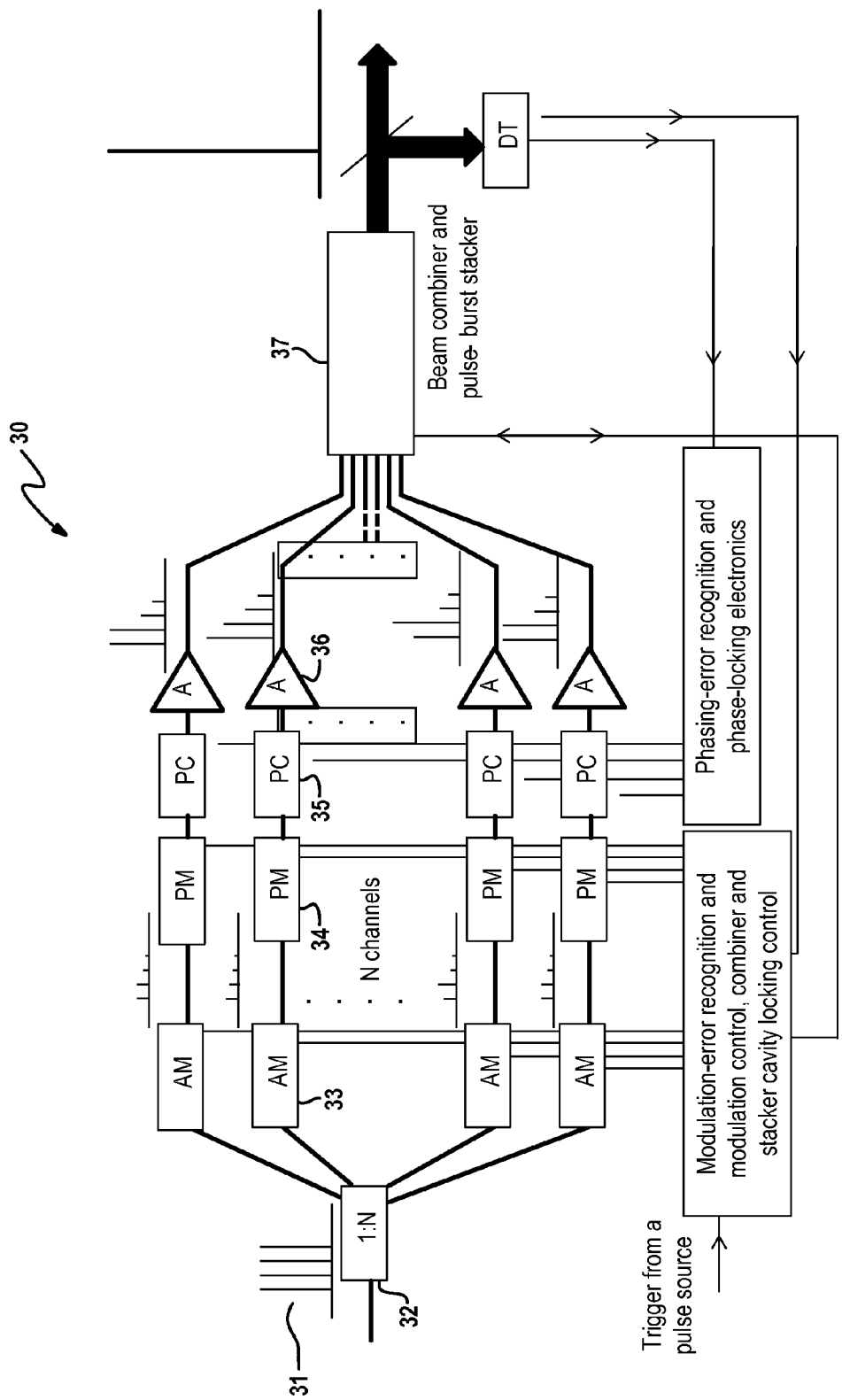
FIG. 3 is a diagram depicting an example embodiment of a beam combining and pulse stacking system.

FIG. 3 depicts an example embodiment for implementing the proposed beam combining and pulsing stacking technique which can be contrasted with previous methods. In previous methods, a periodic pulse train is split into N equal-amplitude signals, which are then launched into multiple parallel amplification channels. Each signal in each individual channel are then uniquely phase modulated so that the frequency-comb structure of each periodic pulse train in each channel is shifted in frequency and the phase being different for each channel. Using a suitable selection of these frequency shifts as well as a suitable beam combiner, it possible to reconstitute this periodic pulse train, albeit at an N-times reduced repetition frequency.

Likewise, a periodic pulse train 31 serves as the input to the beam combining and pulse stacking system 30. The periodic pulse train 30 is first split by a beam splitter 32 into N optical signals. In each of the N optical signals, the periodic pulse train is then manipulated to form optical signals having one or more clusters of pulses (also referred to herein as pulse bursts), where amplitude and phase of pulses in each cluster varies amongst pulses. In this example embodiment, amplitude and phase modulation are used to carve-out clusters of pulses from the period pulse train. An optical amplitude modulator 33 and an optical phase modulator 34 are disposed in each parallel channel. The role of the amplitude and phase modulation sequence is to produce pulse burst with the required amplitudes and phases of each individual pulses, so that they can be combined and time-stacked in the properly designed beam combining and pulse stacking arrangements. Amplitude and phase modulation pattern for each of the N signals will in general be different between different signals. It is noted that these clusters of pulses can be repeated in time after some arbitrarily chosen time duration T (which is, however, an integer of the original pulse repetition rate), which is not related, and, therefore, can be much longer, than the combining resonator round-trip time.

Pulses from each of the clusters are combined coherently in the time domain using one or more resonant cavities 37 as will be further described below. It is important that all of the parallel channels be phase locked. Thus, additional phase modulators for phasing-locking the parallel channels (and controlled by properly configured phase-locking circuits) 35 are preferably interposed between phase modulators 34 and the resonant cavity 37. Note that in some configurations, phase modulators 34 and 35 could be combined into one, performing both pulse-burst phase modulation and parallel-channel phasing with the same device. Prior to coherently combining pulses, it may also be beneficial to amplify each of the N optical signals. In this case, an optical amplifier 36 is disposed in each channel between the phase locking circuit 35 and the resonant cavities 37.

Additionally, the resonant cavities 37 should be actively controlled so that each cavity maintains its round-trip time precisely at its prescribed level, with a prescribed phase shift. Note that the RC round-trip time should match the repetition period of the initial pulse train, and, consequently, the pulse repetition period in each pulse burst. However, producing the prescribed phase shift (round-trip phase) for each cavity requires very small (on the order of one optical-cycle of the optical signal) mismatch for each cavity round-trip time. At the output of the N-parallel amplifier array 36, all of the beams should be properly arranged to be incident into the resonant cavities as described in more detail below.

Figure 4A:
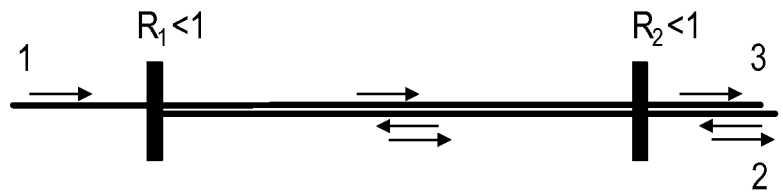
FIGS. 4A-4C are diagrams depicting example implementations for resonant cavities used for beam combining and pulse stacking.
Figure 4B:
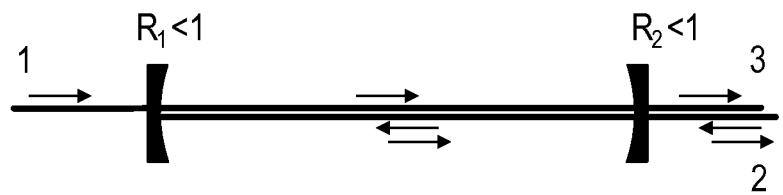
Figure 4C:
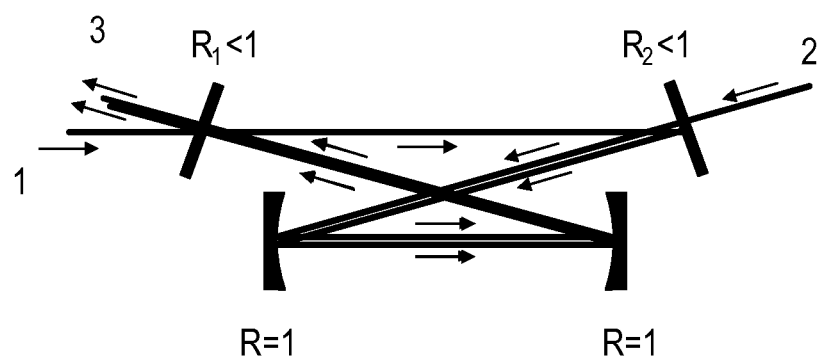

Example implementations for resonant cavity beam combiners and pulse stackers are shown in FIG. 4A-4C. A simple flat-mirror Fabry-Perot interferometer cavity is shown in FIG. 4A. One advantage of this implementation is that the finesse of the combining cavity is generally low, approximately equal to the number of channels combined in a cascaded scheme. Low-finesse cavities are much easier to align than high-finesse cavities. For clarity, "1" indicates input 1 beam, which is configured to be transmitted through the Fabry-Perot interferometer cavity, "2" indicates input 2 beam, configured to be reflected from the Fabry-Perot interferometer cavity; and "3" indicates the combined beam comprised of the transmitted and reflected beams.

In order to avoid significant beam expansion due to propagation distance in a resonant-cavity combiner, it may be beneficial to include curved refocusing mirrors into an Fabry-Perot interferometer cavity as seen in FIG. 4B. The curved mirrors are aligned in such a way that beam size is reproduced exactly every round-trip time in the cavity. Configurations in FIGS. 4A and 4B require external separation between the incident reflection-path and the combined beams. This can be done, for example, using a standard polarization beam splitter and a suitable waveplate or a Faraday rotator. The configuration shown in FIG. 4C has the advantage that all the incident beams are separate from each other and, most importantly, from the combined beam.

Figure 5A:
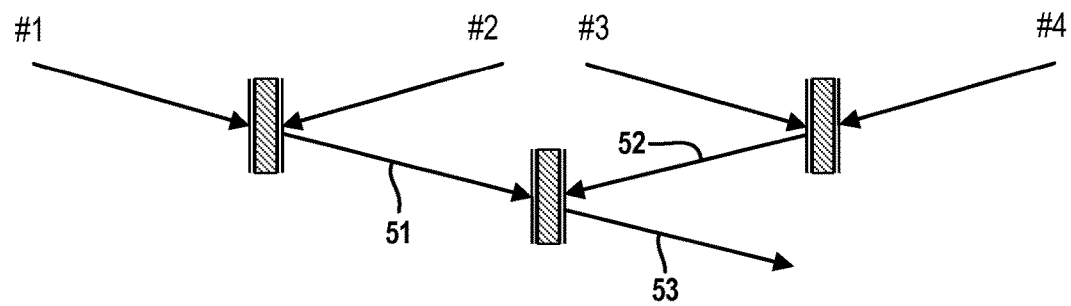
FIGS. 5A and 5B are diagrams depicting example arrangements for cascading resonant cavities.
Figure 5B:
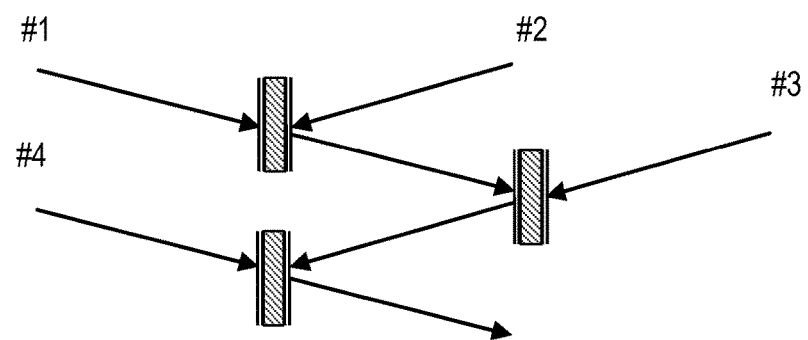

To combine more than two optical beams, the resonant cavity beam combiners and pulse stackers need to be cascaded together. Two example arrangements are shown in FIGS. 5A and 5B. In FIG. 5A, Fabry-Perot interferometer cavities may be arranged in a parallel cascading manner. That is, optical beams are paired together (e.g., #1 and #2) and each pair of optical beams are combined together concurrently using a series of cavities. Combined optical beams are likewise paired together (e.g., 51 and 52) and combined with each other using another series of cavities. This arrangement is repeated until two optical beams are combined to form a single optical beam 53.

Fabry-Perot interferometer cavities may also be arranged in a sequential cascading manner as seen in FIG. 5B. In this arrangement, two optical beams (e.g., #1 and #2) are first combined together using one cavity to a form a first combined beam. The combined beam is then combined with a third beam (i.e., #3) using another cavity. This arrangement is again repeated until all of the N optical beams have been combined together to form a single optical beam.

Figure 6A:
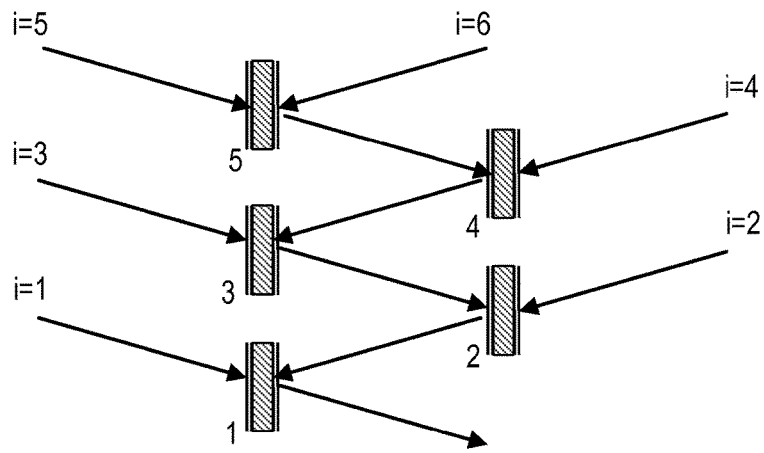
FIG. 6A illustrates a specific example for sequentially cascading an array of Fabry-Perot interferometer cavities.
Figure 6B:
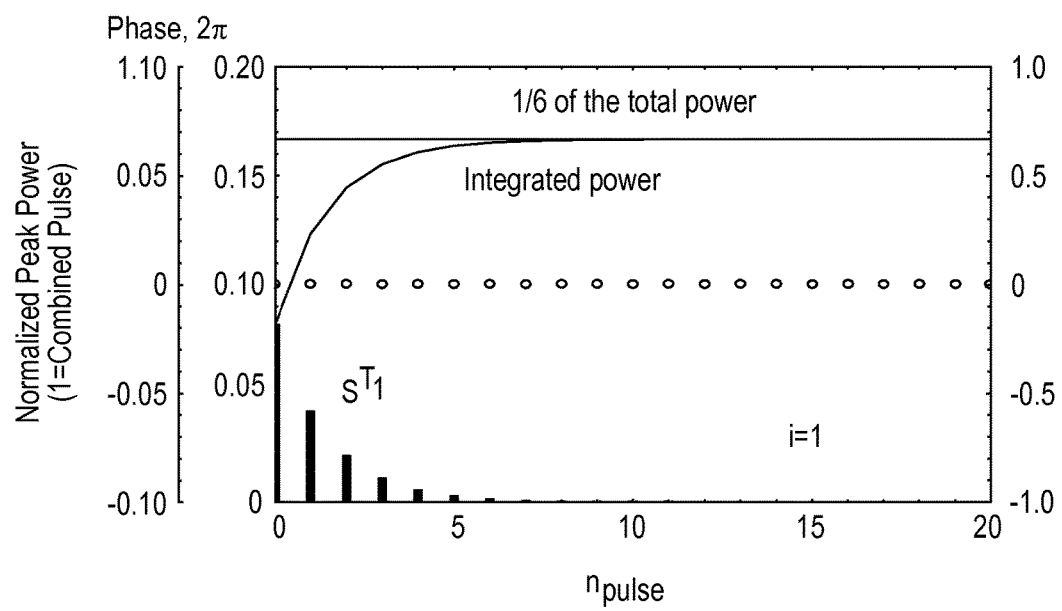
FIGS. 6B-6G are graphs pulse profiles for six beams input into the cascading arrangement of FIG. 6A.
Figure 6C:
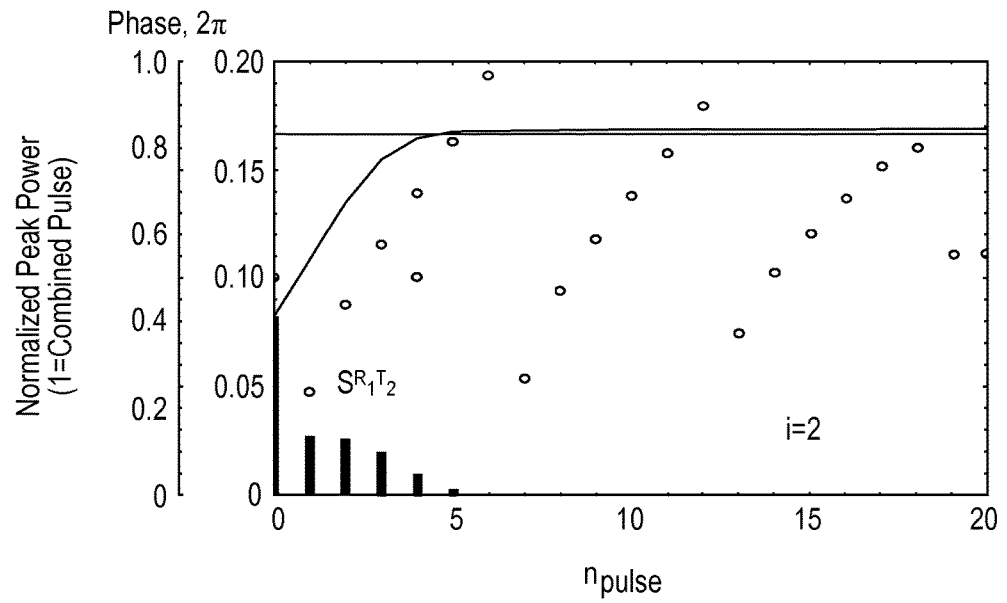
Figure 6D:
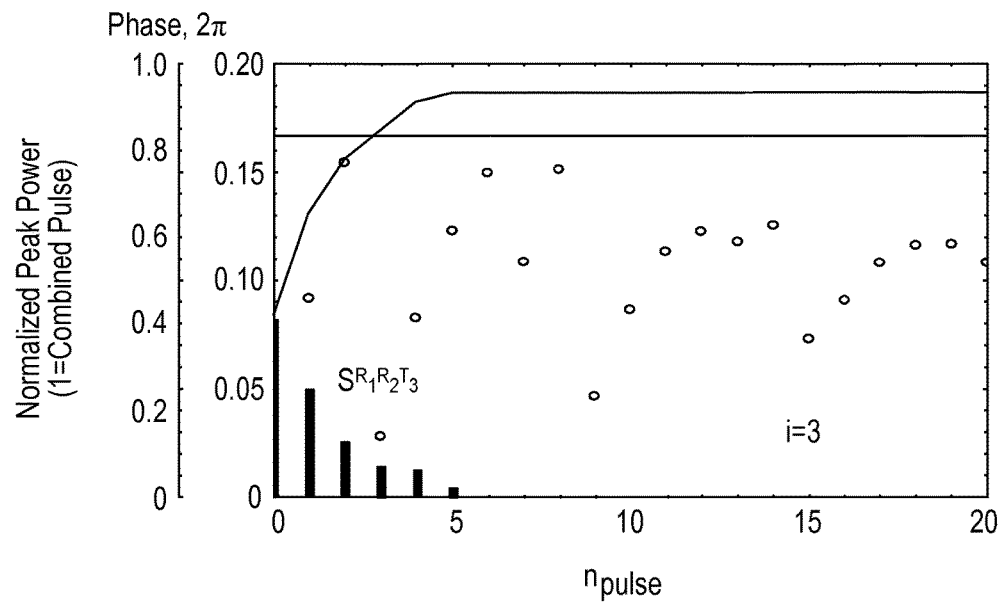
Figure 6E:
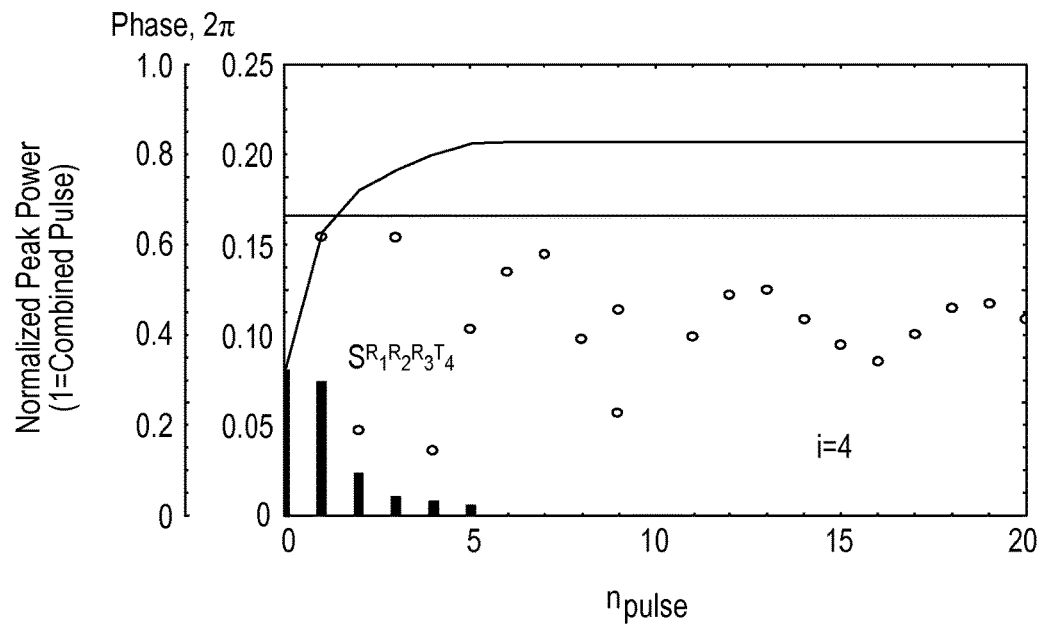
Figure 6F:
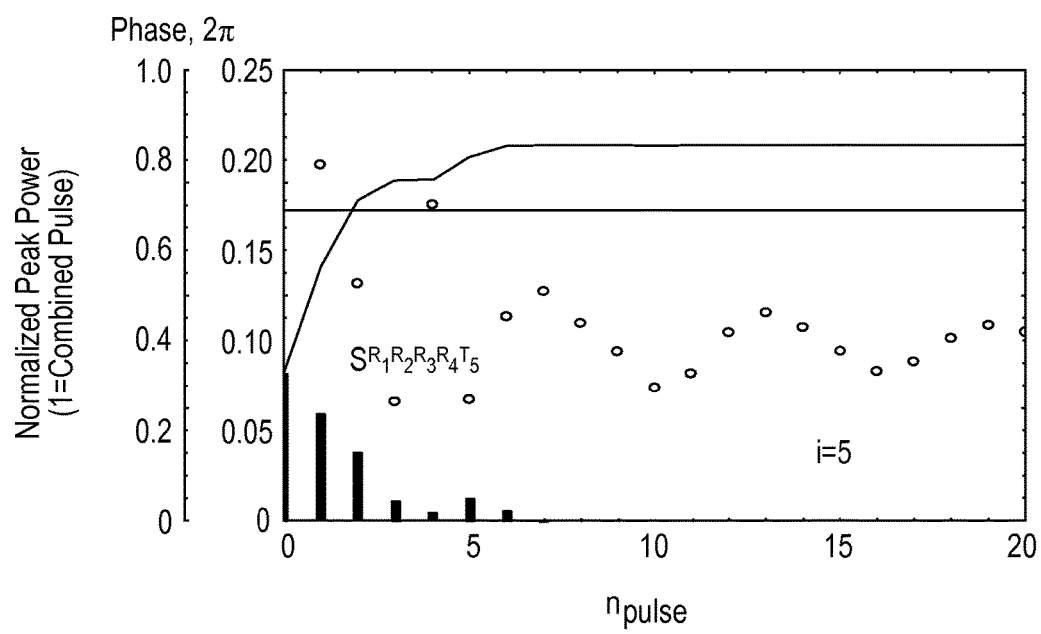
Figure 6G:
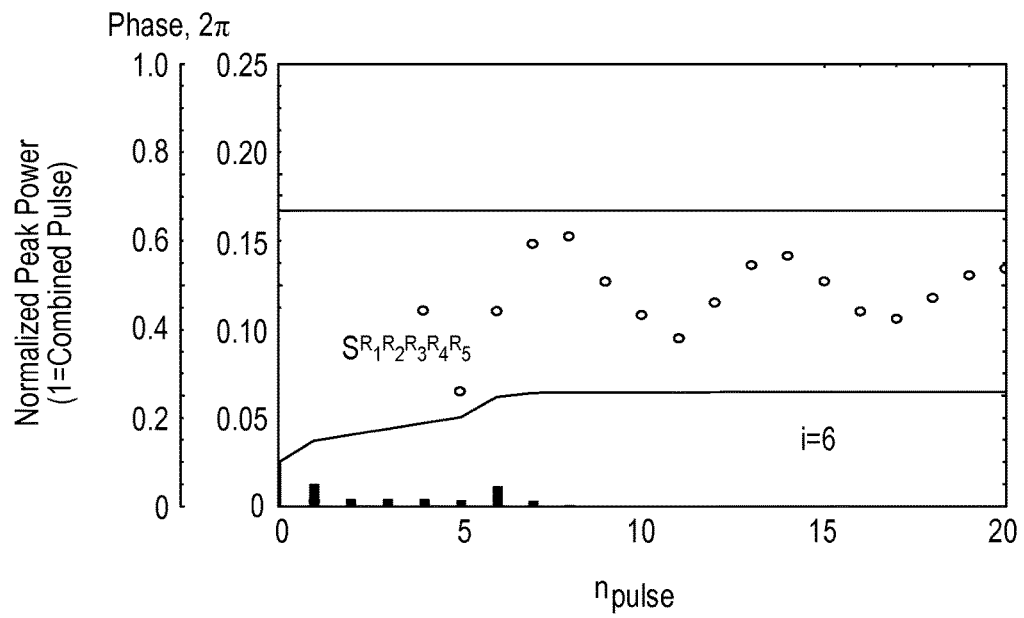

FIG. 6A illustrate a specific example of combining optical beams using a sequential cascading arrangement. In this example, six input beams are combined using an array of five Fabry-Perot interferometer cavities. End-of-cavity mirrors are identical for each cavity. Each cavity is further characterized by a different mirror reflectivity for each of the cavity mirrors, as well as by individually different phase-shifts produced by each resonant cavity. Specific values used in this example are as follows:

$R_1 = 0.7143, \Delta\varphi_1 = 0$ $R_2 = 0.6619, \Delta\varphi_2 = \pi/3$ $R_3 = 0.5845, \Delta\varphi_3 = 2(\pi/3)$ $R_4 = 0.4565, \Delta\varphi_4 = 3(\pi/3)$ $R_5 = 0.1956, \Delta\varphi_5 = 4(\pi/3)$ It is readily understood that values will differ for other arrangements.

FIGS. 6B-6G depict pulse profiles for the six input beams. More specifically, amplitudes (i.e., peak powers) and phases for each input signal are indicated by red bars and blue circles, respectively. Horizontal axis is labeled in terms of the pulse number in the sequence. Note that earlier time is on the right-hand and later time is toward the left-hand. Specific pulse-burst period value is not important in the calculation and can be freely chosen. For reference, integration of the total pulse energy in each pulse burst (cluster) (red solid line), as well as a horizontal line indicating ⅙ of the total energy obtained by cumulatively summing energies of all the pulses in all the inputs are also shown in the figures. Input each of the six input beams into the sequential cascading arrangement described in FIG. 6A yields an output beam with a single solitary pulse. The important aspect of this example is that the highest (normalized) pulse peak-power amplitude in any input beam/pulse cluster does not exceed 0.08, which means that the total combined-pulse energy is 1/0.08=12.5 times larger than the highest energy pulse in any of the input signals—energy enhancement of more than twice the number of channels.

Figure 7:
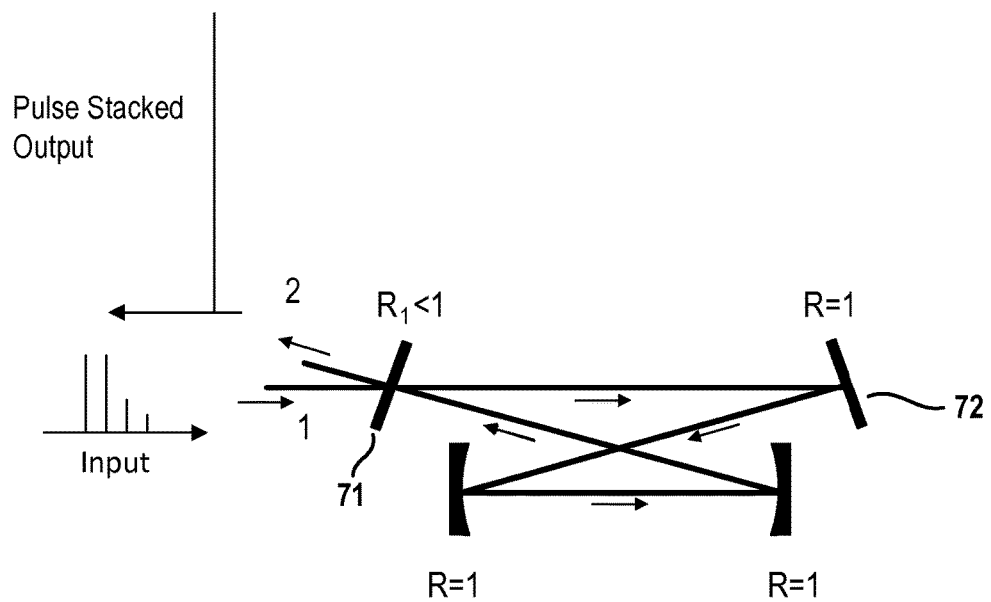
FIG. 7 is a diagram illustrating that the pulse stacking technique can be extended to a resonant cavity with only one input mirror.

The beam combining and pulse stacking technique can also be extended to a resonant cavity with only one input mirror as seen in FIG. 7. The resonant cavity can be defined by an input mirror 71 having partial reflectivity and the other mirror 72 defining the cavity having 100% reflectivity. For example, such cavity could be implemented by a Gires-Tournois interferometer. In operation, there is only a single incident beam and a single reflected output beam since all of the power is completely reflected. Thus, no beam combining can be achieved with this cavity. Pulse stacking in time, however, can be achieved similar to the partially-reflecting combiner discussed above. Again, it is possible to calculate the amplitudes and phases for each pulse in the incident pulse burst needed to form a solitary pulse.

Figure 8:
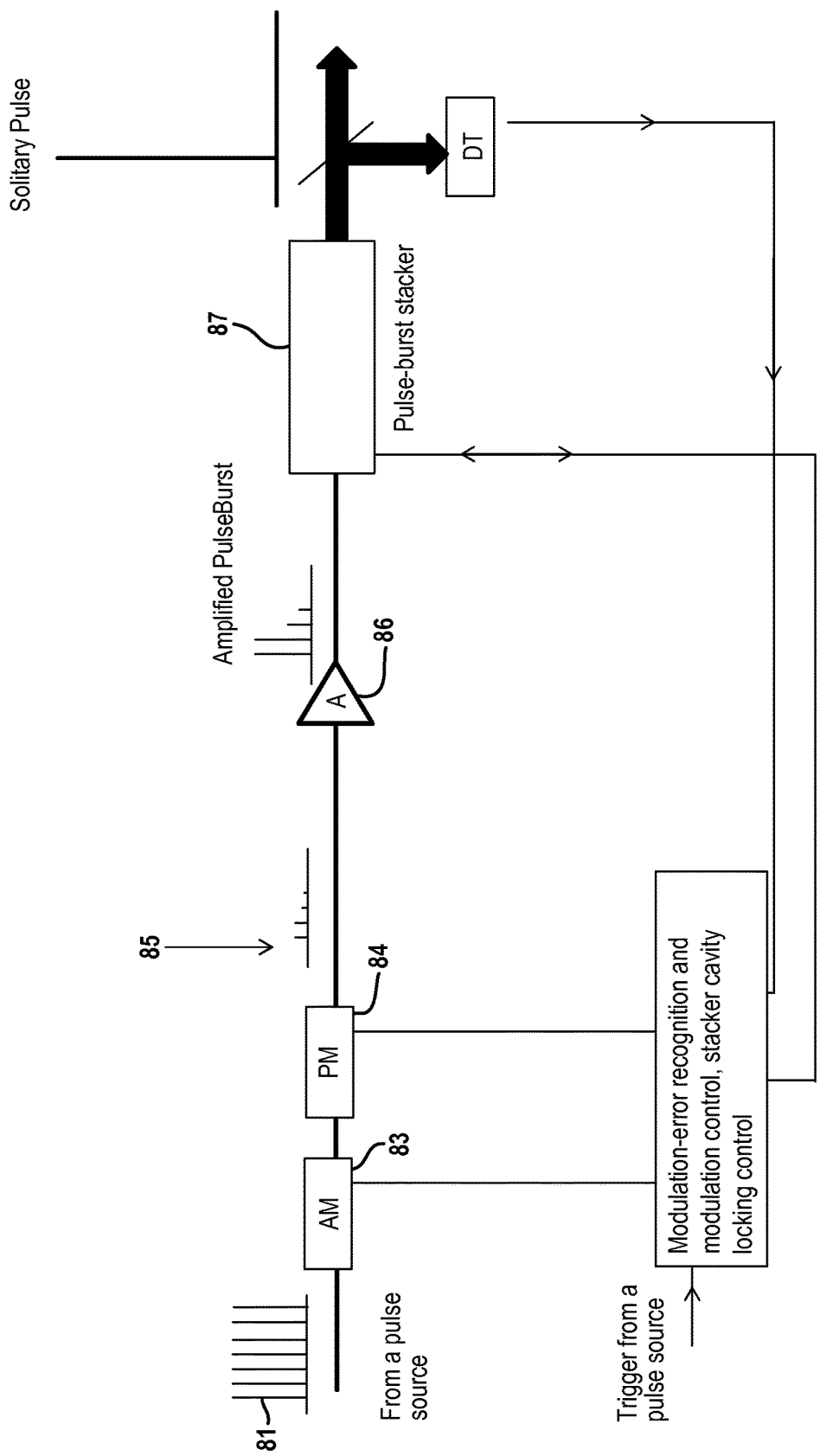
FIG. 8 is a diagram depicting an example embodiment of a pulse stacking system using fully reflective resonant cavities.

FIG. 8 depicts an example embodiment for implementing the pulsing stacking technique using one or more resonant cavities with 100% reflectivity. In this example, a single periodic pulse train 81 is input into a sequence of an amplitude modulator 83 and a phase modulator 84, which again modulate each-pulse amplitude and phase in the solitary pulse burst 85. The pulse-burst can be optionally amplified by an optical amplifier 86 to boost its power, but practical advantages can also be achieved without this amplification. Next, the pulse-burst is incident into a pulse stacker arrangement 87 to form an output beam having a solitary pulse. The pulse stacker arrangement 87 can be implemented by a single fully reflective resonant cavity or multiple fully reflective resonant cavities as further described below.

Figure 9:
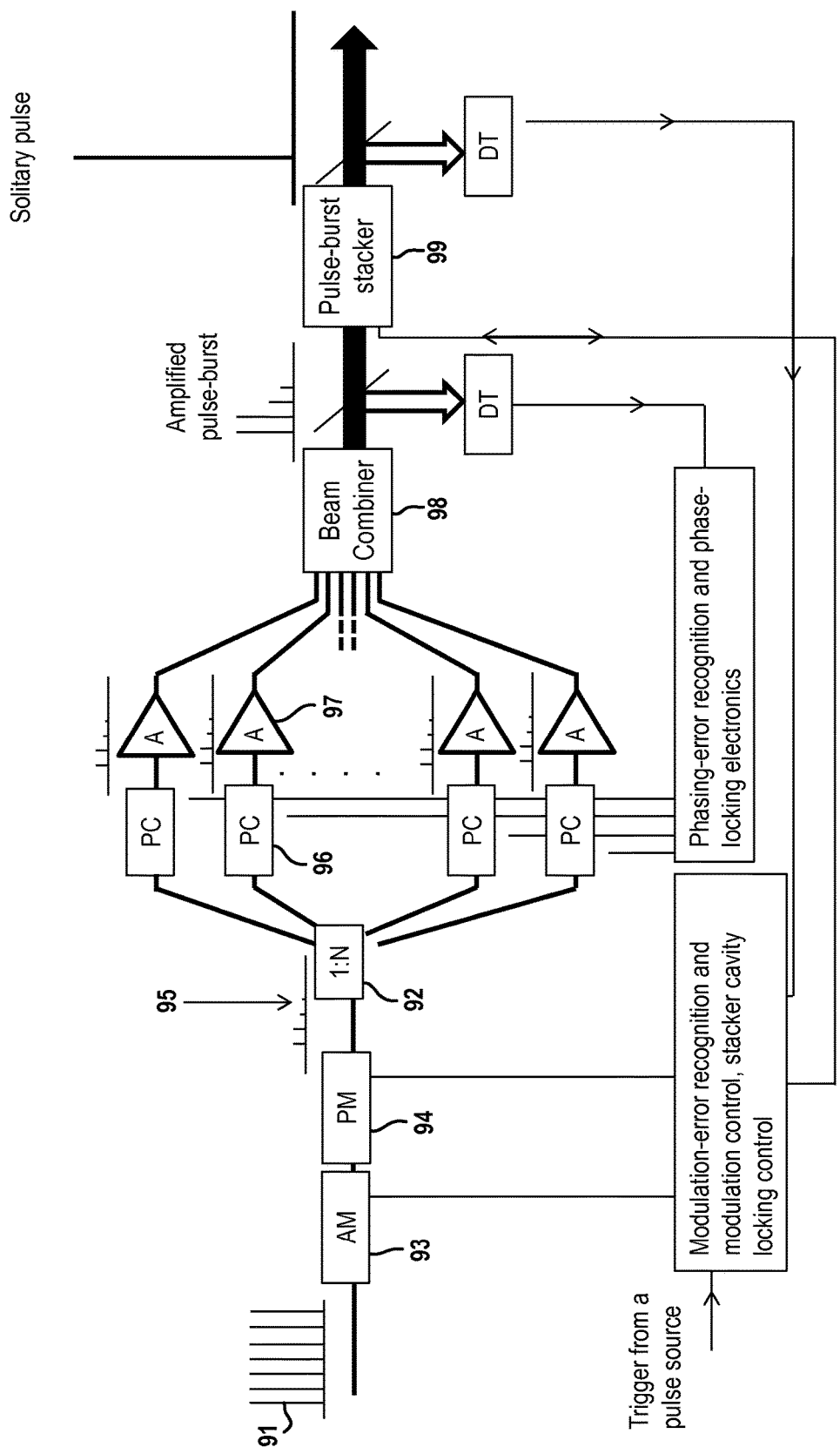
FIG. 9 is a diagram depicting an alternative embodiment of a pulse stacking system using fully reflective resonant cavities.

An alternative embodiment for implementing the pulse stacking technique using one or more fully reflective resonant cavities is shown in FIG. 9. A single periodic pulse train 91 is again input into a sequence of an amplitude modulator 93 and a phase modulator 94, which modulate each-pulse amplitude and phase in the solitary pulse burst 95. In this example, much higher pulse energies and power can be achieved by inserting N parallel-channel amplification array. The solitary pulse-burst 95 is split by a beam splitter 92 into N identical optical signals and thereby forming N parallel channels. In each channel, the optical signal is passed through a phase-locking modulator 96 (each controlled by a properly arranged phase-locking electronic circuit) and an optical amplifier 97. The N amplified optical beams are then coherently combined into a single beam using, for example, conventional phasing schemes and conventional beam combiners as indicated at 98. Example beam combiners may include but are not limited to binary-tree combiners or diffractive optical element (DOE) combiners. Lastly, the recombined and amplified pulse-burst is incident onto a pulse stacker arrangement 99 to form an output beam having a solitary pulse. This embodiment enables achieving pulse energies and powers well beyond the single-channel power limitations. It is also important to note that this N-channel array can be configured for a spectral-coherent combining as described in by Wei-zung Chang, Tong Zhou, Leo A. Siiman, and Almantas Galvanauskas in "Femtosecond pulse spectral synthesis in coherently-spectrally combined multi-channel fiber chirped pulse amplifiers," Opt. Express 21, 3897-3910 (2013). In this case, this array would allow overcoming not only power limitations, but could also overcome spectral bandwidth limitations of each individual amplification channel. This, for example, can be important when generating ultrashort pulses. In this implementation, the N-channel array should contain spectral beam splitting and combining elements as described in the publication noted above. This array could also be a "hybrid" setup containing a combination of both coherent and spectral-coherent combining arrangements.

Figure 10A:
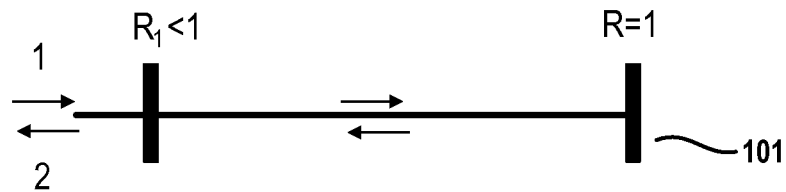
FIGS. 10A-10C are diagrams depicting example implementations of fully reflective resonant cavities.
Figure 10B:
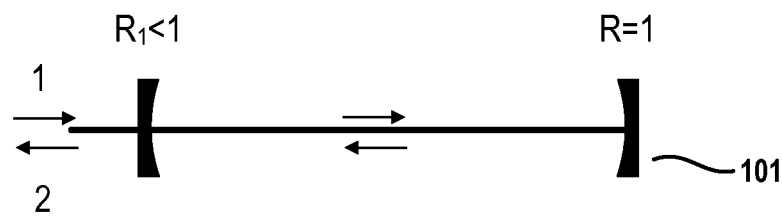
Figure 10C:
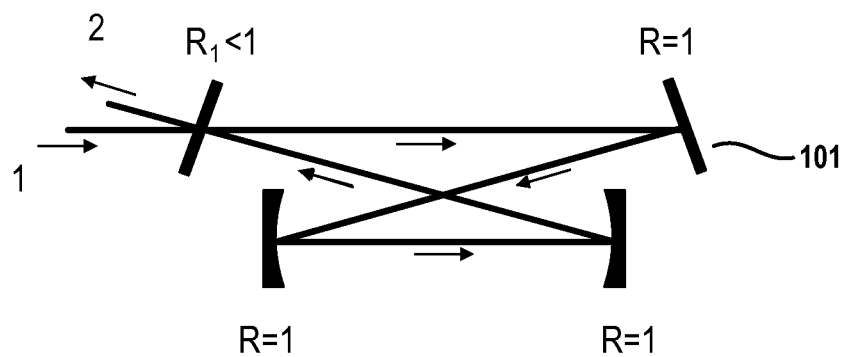

FIGS. 10A-10C illustrate example configurations for a fully reflective resonant cavity. In these configurations, the second cavity mirror 101 of the cavity is 100% reflective but otherwise these configurations are analogous to those in FIGS. 4A-4C. Thus, there is only one incident beam marked as "1" and one output beam marked as "2". A Gires-Tournois interferometer cavity is an example of such fully reflective resonant cavity although other types of resonant cavities are also contemplated.

There are two general constrains on the incident pulse burst, and on the parameters of the resonant cavity. The first constraint is that amplitudes and phases imprinted (using amplitude and phase modulators) on all the pulses in the incident pulse burst should be such that a single stacked pulse is produced at the combiner output. This constraint is relevant both for Fabry-Perot and Gires-Toirnois based combining schemes. This constraint can be formulated mathematically. As an example let's consider combining of two signals with a single Febry-Perot combiner. Let's denote a single stacked pulse at the combiner output as $\tilde{p}_s(t)$ in the time domain. Spectrum $\tilde{P}_s(v)$ of this pulse can be obtained by fourier transform of this time-domain signal using a standard fourier-transform definition:

$$\tilde{P}_s(v) = \mathfrak{I}(\tilde{p}_s(t)) = \int_{-\infty}^{+\infty} \tilde{p}_s(t) \cdot e^{-i\,2\pi vt}\,dt.$$

Fabry-Perot spectral transfer functions for reflection $\tilde{F}^R(v)$ and transmission $\tilde{F}^T(v)$ are:

$$\tilde{F}^R(v) = \frac{\sqrt{R} \cdot (1 - e^{i\delta})}{1 - R \cdot e^{i\delta}}$$

and $$\tilde{F}^T(v) = \frac{e^{i\delta/2} \cdot (1 - R)}{1 - R \cdot e^{i\delta}}.$$

In this example we take a Fabry-Perot configuration from FIG. 4 with the two partially-reflecting mirrors equal to each other $R_1=R_2=R$. Cavity round-trip phase is denoted as $\delta$. We can now express this constraint on the incident pulse burst to produce a single output pulse mathematically as:

$$\tilde{P}_s(v) \cdot \tilde{F}^R(v) + \tilde{P}_s(v) \cdot \tilde{F}^T(v) = \tilde{P}_s(v).$$

Here $\tilde{P}_s(v) \cdot \tilde{F}^R(v)$ describes the spectrum of the pulse burst incident into the reflection port 1 and $\tilde{P}_s(v) \cdot \tilde{F}^T(v)$ the spectrum of the pulse burst incident into the transmission port 2, that produce the solitary pulse at the output of the Fabry-Perot combiner. The case with two different reflectivities can be described by using appropriate reflection and transmission transfer functions for such a cavity. Similarly, for the Gires-Tournois pulse stacker case this constraint can be expressed as $$\tilde{P}_s(v) \cdot \tilde{F}^{GTI}(v) = \tilde{P}_s(v),$$

where left-hand term defines the incident pulse spectrum required to produce a single solitary output pulse. Here $\tilde{F}^{GTI}(v)$ is a Gires-Tournois cavity spectral transfer function:

$$\tilde{F}^{GTI}(v) = \frac{\sqrt{R} - e^{i\delta}}{1 - \sqrt{R} \cdot e^{i\delta}}$$

with R being front-mirror reflectivity.

It is straightforward to generalize this example from a single cavity to multiple cascaded cavities. For cascaded Gires-Tournois cavities the spectral transfer function of the cascade is simply a product of all individual-cavity transfer functions. For cascading Fabry-Perot cavities one needs to use a product of the transmission and reflection transfer functions encountered by each corresponding input-port signal on its path to the output. For example, in the example case in FIG. 9 for the incident pulse burst into the port i=2 this transfer function will be $^2\tilde{F}^T(v) \cdot {^1\tilde{F}^R}(v)$, where $^2\tilde{F}^T(v)$ is the cavity 2 transfer, and $^1\tilde{F}^R(v)$ is the cavity 1 reflection functions.

The second constraint is such that there would be an energy benefit when combining these pulsed bursts. This means that the total energy of the solitary output pulse should be more than N times larger (N being the number of inputs into the combining arrangement) than the highest energy of any individual pulse in all the incident pulse bursts. Otherwise, if this combined-output energy is only N times larger, then this could be achieved with any conventional combining approach. Also, this constraint is relevant only for the Fabry-Perot combining. For the Gires-Tournois combining there always is an energy benefit, as long as a solitary output pulse is produced.

Theoretical description of coherent pulse stacking (i.e. temporal pulse combining) with a single Gires-Tournois Interferometer, from which the requirements for a stacking cavity and input pulse burst parameters can be calculated, is given here.

Figure 14:
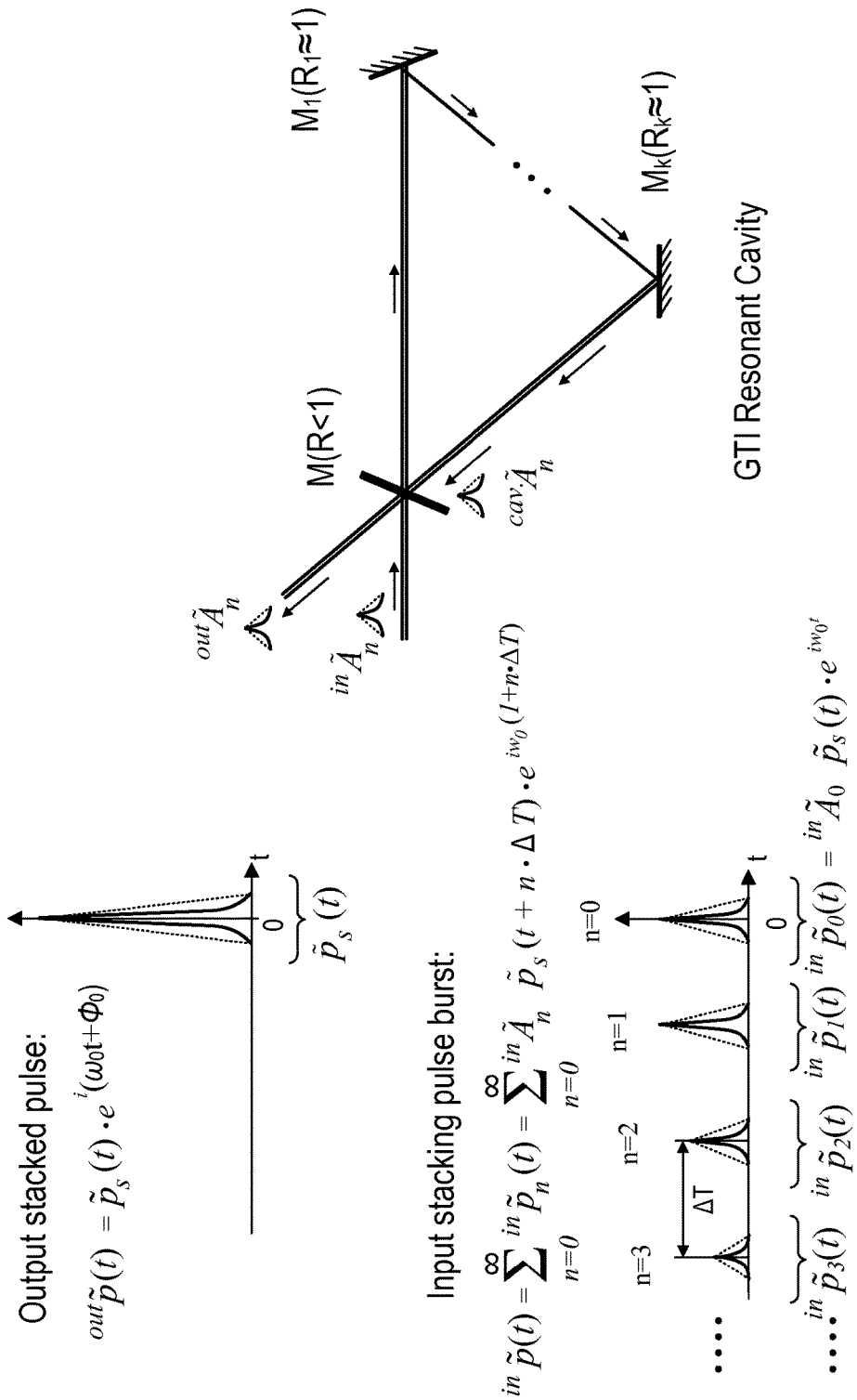
FIG. 14 is a diagram depicting coherent pulse stacking with a Gires-Tournois interferometer.

A reflecting interferometer can be configured either as a linear or a traveling-wave cavity. A linear reflecting cavity is essentially a Fabry-Perot interferometer with one completely reflecting mirror, which is commonly referred to as a Gires-Tournois interferometer (GTI). The practical advantage of a traveling-wave reflecting cavity, shown in FIG. 14, is that it allows one to spatially separate the incident input and reflected output beams. For usage convenience we will also refer to this traveling-wave cavity as a GTI. Let's consider a traveling-wave GTI cavity, consisting of a partially reflecting front-mirror M (with power reflectivity $R=r^2<1$), and K completely reflecting beam-folding mirrors $M_1, M_2, \ldots, M_K$, schematically shown in FIG. 14. Ideally, we should have $R_k=1$ for all k=1, 2, . . . K, but in practice it will always be $R_k \approx 1$. We can denote the round-trip cavity transmission as $\alpha = r_1 \cdot r_2 \cdot \ldots \cdot r_K$, where $r_k$ is a corresponding k-th mirror amplitude reflection coefficient. Then coefficient $\alpha^2 = R_1 \cdot R_2 \cdot \ldots \cdot R_K$ describes power loss per each round trip due to the finite reflectivity of the folding mirrors. If the round trip distance in this traveling-wave cavity is P, then the round trip time is $\Delta T = P/c$ (here c is the velocity of light), and the round-trip phase is $\delta = 2\pi P/\lambda_0 = \omega_0 \cdot \Delta T$ (here $\lambda_0$ and $\omega_0$ are, respectively, the signal central wavelength and angular frequency). We can describe electric field transmission through this cavity by a transmission matrix [7]:

$$[T] = \begin{bmatrix} 1 & 0 \\ 0 & \alpha \cdot e^{i\delta} \end{bmatrix}. \quad (1)$$

The incident and reflected fields at both sides of the front mirror M can be described by a unitary scattering matrix [S], which can be written in a symmetric form:

$$[S] = \begin{bmatrix} r & it \\ it & r \end{bmatrix}. \quad (2)$$

Here r is the front mirror amplitude reflection and t its amplitude transmission coefficient, which for a lossless (and reciprocal) dielectric mirror are related by $t^2 = 1 - r^2$, with both r and t being real quantities.

Let's assume that all pulses at the input, output and circulating inside of a GTI cavity have identical complex envelopes $\tilde{p}_s(t)$, where complex notation accounts for the fact that stacking can be achieved with bandwidth-limited (described by real envelopes $\tilde{p}(t) \equiv p_s(t)$) as well as with chirped (described by complex envelopes $\tilde{p}_s(t)$) pulses. As illustrated in FIG. 14, we seek to convert an input pulse burst $^{in}\tilde{p}(t)$ into a single output "stacked" pulse:

$$^{in}\tilde{p}(t) = \sum_j {^{in}\tilde{p}_j(t)} \rightarrow {^{out}\tilde{p}(t)} = \tilde{p}_s(t) \cdot e^{i(\omega_0 t + \phi_0)}. \quad (3)$$

Figure 15:
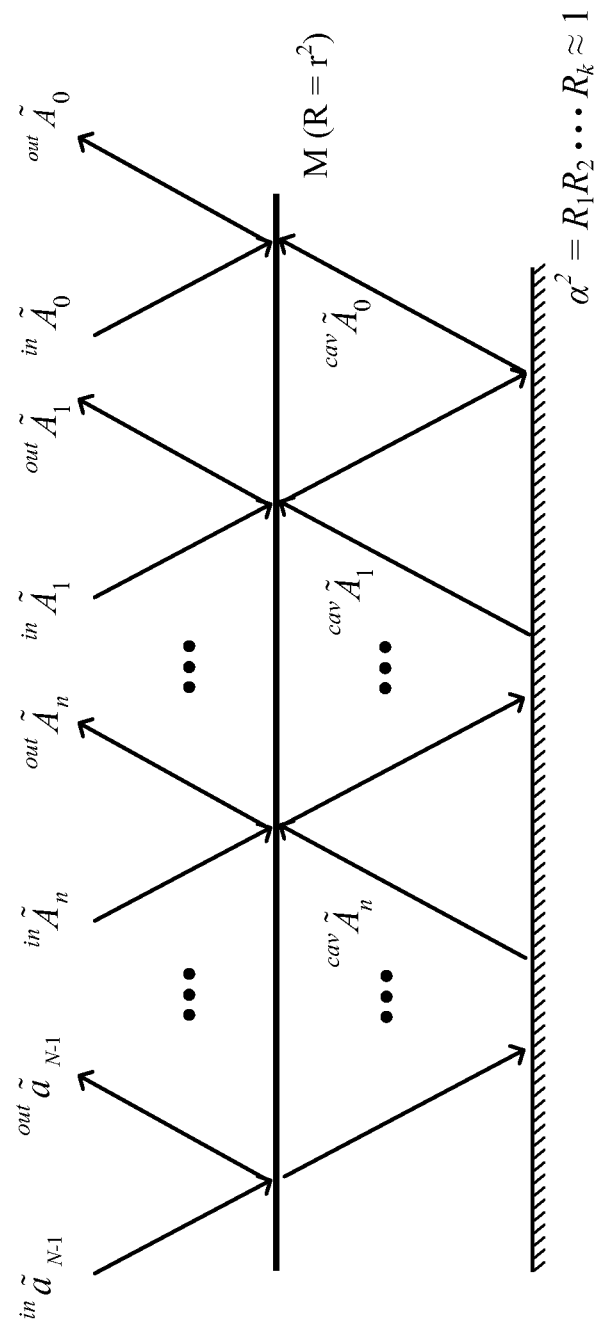
FIG. 15 is a diagram depicting amplitudes of all incident, in-cavity and output pulses in a conceptual 2-mirror GTI cavity.

Let's choose the time axis reference such that this output stacked pulse is centered at t=0. Then we can enumerate all the pulses in the incident train as $$^{in}\tilde{p}(t) = \sum_{n=0}^{\infty} {^{in}\tilde{p}_n(t)} = \sum_{n=0}^{\infty} {^{in}\tilde{A}_n} \cdot \tilde{p}_S(t + n \cdot \Delta T) \cdot e^{i\omega_0(t + n \cdot \Delta T)}, \quad (4)$$

so that n=0 corresponds to the pulse at t=0 and n= 1, 2, . . . are at correspondingly increasing separations n·$\Delta T$ at negative t values, as shown in FIG. 14. Here $^{in}\tilde{A}_n = {}^{in}A_n \cdot e^{i\varphi_n}$ is the complex amplitude characterizing the amplitude and phase of the n-th individual pulse $^{in}\tilde{p}_n(t)$ of the semi-infinite input pulse burst. The pulse repetition period $\Delta T$ should be equal to the cavity round trip time $\Delta T$, since interference at the front mirror M occurs only when the incident pulse and the circulating in-cavity pulse arrive at that mirror simultaneously. As shown in FIG. 15, let's denote the amplitude of the circulating pulse arriving at the front mirror M from inside the cavity simultaneously with the $^{in}\tilde{A}_n$ input pulse as $^{cav.}\tilde{A}_n$. Interference at the front mirror M between these two simultaneously incident pulses $^{in}\tilde{A}_n$ and $^{cav.}\tilde{A}_n$ produces a "reflected" output pulse with an amplitude $^{out}\tilde{A}_n$ and a "transmitted" in-cavity pulse, which after passing mirrors $M_1$ through $M_K$ arrives at M as a subsequent circulating pulse $^{cav.}\tilde{A}_{n-1}$. Amplitudes of all incident, in-cavity circulating, and output pulses are shown in FIG. 15 for a conceptualized 2-mirror GTI cavity. Using the front-mirror scattering matrix [S] given by the Eq. (2), and the cavity transmission matrix [T] given by the Eq. (1) we can describe this interference (plus a subsequent round trip) using the following matrix equation:

$$\begin{bmatrix} {}^{out}\tilde{A}_n \\ {}^{cav.}\tilde{A}_{n-1} \end{bmatrix} = \begin{bmatrix} 1 & 0 \\ 0 & \alpha \cdot e^{i\delta} \end{bmatrix} \cdot \begin{bmatrix} r & it \\ it & r \end{bmatrix} \cdot \begin{bmatrix} {}^{in}\tilde{A}_n \\ {}^{cav.}\tilde{A}_n \end{bmatrix}, \quad (5)$$

for each n=0, 1, 2, . . . .

Ideally, when coherent pulse stacking is achieved then $^{out}\tilde{A}_0=1$ and $^{out}\tilde{A}_n=0$ for all n>0. This means that for all incident pulses prior to the last pulse (i.e. n>0), totally destructive interference between the incident and circulating pulses should eliminate all reflections from the front mirror, thus storing all incident pulses as a single circulating pulse inside the cavity. For the last incident pulse (n=0) totally constructive interference in the reflection direction of that mirror should combine the incident and circulating pulses into a single output pulse, thus extracting all stored circulating energy. Additionally, it is $^{cav.}\tilde{A}_n=0$ and $^{out}\tilde{A}_n=0$ for all n<0, since ideally there should be no field left in the cavity after the last n=0 pulse has passed. Using Eq. (5) above, we can express all these conditions mathematically as:

$$\begin{bmatrix} 1 \\ 0 \end{bmatrix} = \begin{bmatrix} 1 & 0 \\ 0 & \alpha \cdot e^{i\delta} \end{bmatrix} \cdot \begin{bmatrix} r & it \\ it & r \end{bmatrix} \cdot \begin{bmatrix} {}^{in}\tilde{A}_0 \\ {}^{cav.}\tilde{A}_0 \end{bmatrix}, \text{ for } n = 0, \quad (6)$$

and $$\begin{bmatrix} 0 \\ {}^{cav.}\tilde{A}_{n-1} \end{bmatrix} = \begin{bmatrix} 1 & 0 \\ 0 & \alpha \cdot e^{i\delta} \end{bmatrix} \cdot \begin{bmatrix} r & it \\ it & r \end{bmatrix} \cdot \begin{bmatrix} {}^{in}\tilde{A}_n \\ {}^{cav.}\tilde{A}_n \end{bmatrix}, \quad (7)$$

for n = 1, 2, . . . ∞.

By solving the linear-equation sets Eq. (6) and, iteratively, Eq. (7), we get all the complex amplitudes of the pulses in the semi-infinite train at the cavity input, and of the corresponding circulating pulses inside the cavity:

$$\begin{cases} {}^{in}\tilde{A}_0 = r \\ {}^{in}\tilde{A}_n = -(1-r)^2 \cdot r^{n-1} \cdot \dfrac{e^{-in\delta}}{\alpha^n}, & \text{for } n = 1, 2, 3, \ldots \infty \\ {}^{cav.}\tilde{A}_n = -it\left(\dfrac{r}{\alpha \cdot e^{i\delta}}\right)^n, & \text{for } n = 0, 1, 2, \ldots \infty \end{cases} \quad (8)$$

Correspondingly, peak power coefficients $^{in}B_n = |^{in}\tilde{A}_n|^2$ of the incident pulses are:

$$\begin{cases} {}^{in}B_0 = R \\ {}^{in}B_n = \dfrac{(1-R)^2 R^{n-1}}{(\alpha^2)^n}, & \text{for } n = 1, 2, 3, \ldots \infty \end{cases} \quad (9)$$

Note that by defining the output stacked pulse using Eq. (3) we chose its peak power coefficient to be normalized to 1: $^{out}B_0=1$. In an ideal case, when amplitudes of all the pulses in the semi-infinite input train fulfill the Eq. (8), then all other output pulses are absent, i.e. $^{out}B_n=0$ for all n≠0. According to Eq. (8), if the GTI cavity round trip phase is chosen to be $\delta=2\pi m$ (where m is an integer) then the last pulse in the input sequence is out of phase with respect to the rest of the pulses in the sequence. It is easy to recognize from Eq. (9) that the peak powers of all the pulses in the input sequence prior to the last pulse (i.e. n=1, 2, . . . ) are described by a decreasing geometrical progression.

Eq. (8) and (9) describe an ideal semi-infinite input pulse sequence, when the only output is the stacked pulse. In practice one needs to truncate this semi-infinite pulse train into a finite pulse burst consisting of N pulses. Since we count pulses from n=0, the very first pulse in this sequence corresponds to n=N−1. Coherent pulse stacking conditions defined by Eq. (6) and (7) still apply to all the pulses in the finite sequence, except for this very first pulse. Indeed, since there are no prior pulses this n=N−1 pulse can only reflect from the front mirror, because it cannot interfere with any prior field in the GTI cavity. Consequently, we can rewrite the amplitude-coefficient condition set by Eq. (7) for this first n=N−1 pulse as $$\begin{bmatrix} {}^{out}\tilde{a}_{N-1} \\ {}^{cav.}\tilde{A}_{N-2} \end{bmatrix} = \begin{bmatrix} 1 & 0 \\ 0 & \alpha \cdot e^{i\delta} \end{bmatrix} \cdot \begin{bmatrix} r & it \\ it & r \end{bmatrix} \cdot \begin{bmatrix} {}^{in}\tilde{a}_{N-1} \\ 0 \end{bmatrix}. \quad (10)$$

Here we use the lowercase letters $\tilde{a}$ instead of $\tilde{A}$ to distinguish between the $(N-1)^{st}$ pulse amplitude coefficients in the finite and semi-infinite sequences respectively, as shown in FIG. 15. Consequently, Eq. (8) and (10) give us:

$$\begin{cases} {}^{in}\tilde{a}_{N-1} = \dfrac{{}^{in}\tilde{A}_{N-1}}{1-R} \\ {}^{out}\tilde{a}_{N-1} = -\left(\dfrac{r}{\alpha \cdot e^{i\delta}}\right)^{N-1} \end{cases} \quad (11)$$

From this it is clear that the amplitude coefficient of the first input pulse in the finite sequence is by a factor 1/(1−R) larger than the amplitude coefficient of the same input pulse in the semi-infinite sequence, all the other amplitudes of pulses with n<N−1 are the same in both finite and semi-infinite sequences. The GTI output with a finite sequence input contains both the stacked pulse as well as a weak first-pulse reflection with amplitude $^{out}\tilde{a}_{N-1}$. From Eq. (11) describing $^{out}\tilde{a}_{N-1}$ it is also clear that this reflection can be made negligibly small by increasing the length N of the incident pulse burst. For example, for a 9-pulse stacking sequence this reflection peak power can be smaller than $10^{-3}$ of the stacked pulse peak power.

This coherent stacking of multiple pulses into one output pulse containing all the energy of the input pulse sequence is beneficial when amplifying high energy pulses in, e.g. a fiber amplifier, since it enables the amplification of pulses with lower peak powers, thus reducing the detrimental nonlinear effects in an amplifier. This benefit is proportional to the peak-power enhancement factor $$\eta = {}^{out}B_0 / {}^{max}\{{}^{in}B_n\} = 1 / {}^{max}\{{}^{in}B_n\}, \quad (12)$$

where ${}^{max}\{{}^{in}B_n\}$ denotes the highest peak-power coefficient in the incident pulse sequence. One can maximize this peak-power enhancement factor by selecting GTI parameters, which minimize the magnitude of ${}^{max}\{{}^{in}B_n\}$. By inspecting Eq. (9) it is straightforward to recognize that ${}^{max}\eta$ is achieved when ${}^{in}B_0 = {}^{in}B_1$. This condition defines the optimum front-mirror reflectivity $R_{opt}$ of a GTI cavity:

$${}^{in}B_0 = {}^{in}B_1 \rightarrow R_{opt} = \frac{(1-R_{opt})^2}{\alpha^2} \rightarrow R_{opt}^2 - (2+\alpha^2)R_{opt} + 1 = 0,$$

The solution of this quadratic algebraic equation, corresponding to a physically meaningful power reflectivity in the range $0 \leq R \leq 1$, is $$R_{opt} = \frac{(2+\alpha^2) - \sqrt{(2+\alpha^2)^2 - 4}}{2}. \quad (13)$$

Corresponding ${}^{max}\eta$ is $${}^{max}\eta = \frac{1}{R_{opt}} = \frac{\alpha^2}{(1-R_{opt})^2}. \quad (14)$$

For an ideal case when $\alpha^2 = 1$ (all folding mirrors are perfectly reflecting) we have $R_{opt} = 0.382$, and the corresponding highest possible peak-power enhancement for a single GTI cavity of ${}^{max}\eta = 2.62$.

Figure 11A:
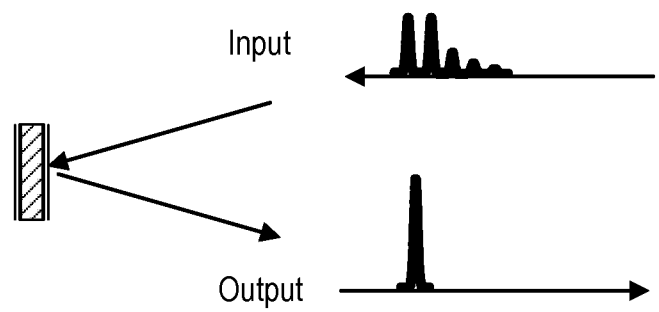
FIGS. 11A and 11B are diagrams illustrating pulse stacker arrangements which may be used in the embodiments of FIGS. 8 and 9.
Figure 11B:
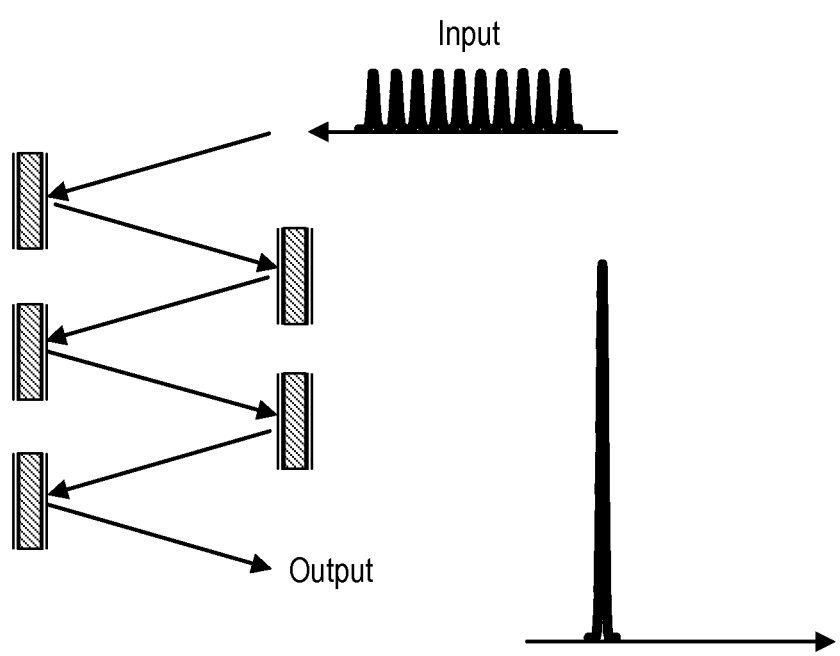
Figure 11C:
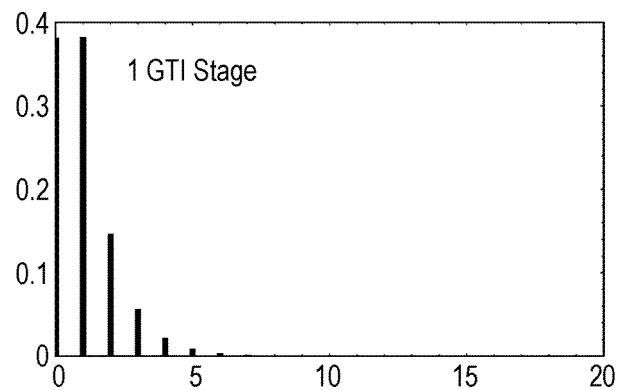
FIG. 11C-11G are graphs depicting examples of calculated pulse-bursts which can serve as input to the sequential cascade of FIG. 11B.
Figure 11D:
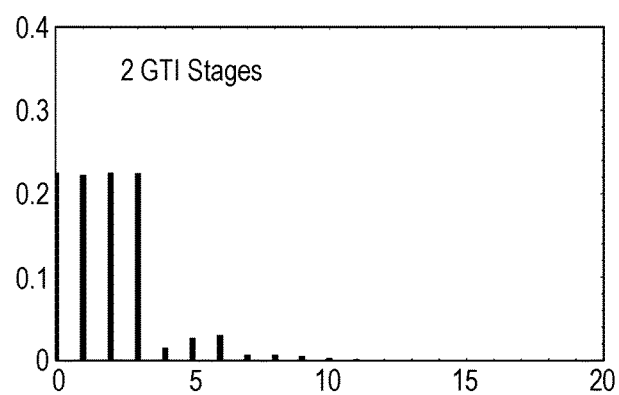
Figure 11E:
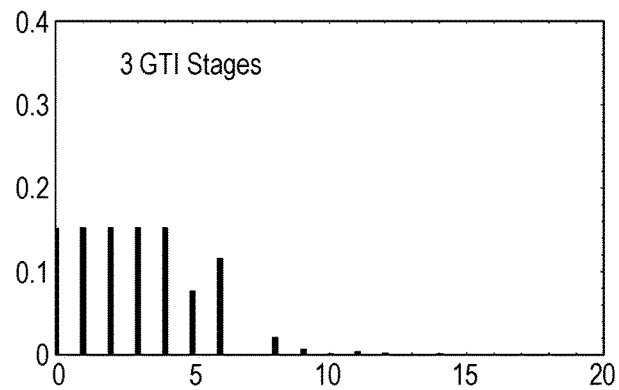
Figure 11F:
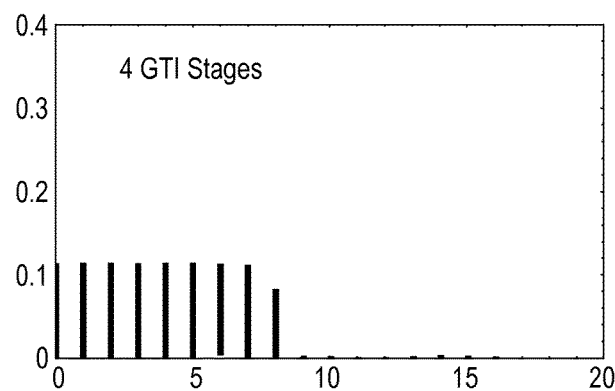
Figure 11G:
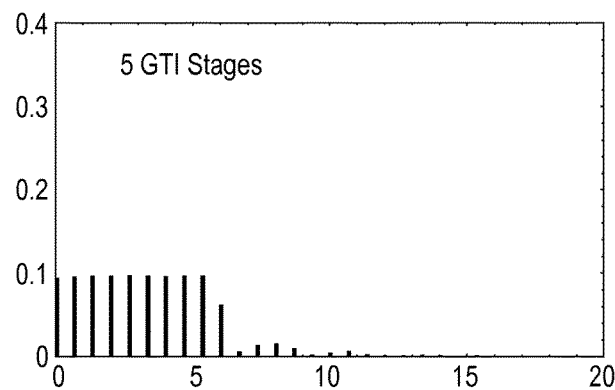

FIGS. 11A and 11B schematically illustrate pulse stacker arrangements 87 which may be used, for example in the embodiments of FIGS. 8 and 9. In FIG. 11A, a single resonant cavity with 100% reflectivity is used stack pulses in the time domain. In FIG. 11B, five resonant cavities are arranged in a sequential cascade. FIGS. 11C-11G depict examples of calculated pulse-bursts which can serve as input to the sequential cascade of FIG. 11B. It is noted that all pulses in the burst are nearly equal in amplitude, and the number of pulses is approximately equal to the double of number of stages in the cascade. This means that energy enhancement X is approximately equal to 2N, where N is the number of stages in the cascade. It is important to note that these equal amplitudes have been achieved by optimizing reflectivities of the front mirrors and each individual stage of the cascade, as well as their individual resonant-cavity phases. Without this optimization, equal amplitudes would not be achieved.

Figure 16A:
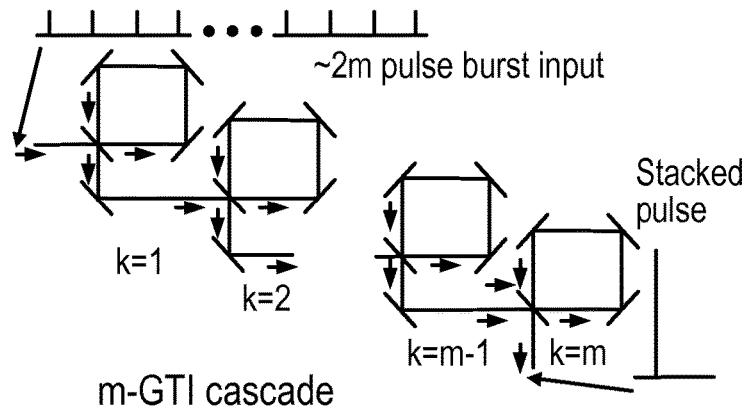
FIG. 16A is a diagram illustrating m cascaded equal-roundtrip GTI cavities.

Next, this optimization is described theoretically, showing how stacking of large numbers of equal-amplitude pulses can be achieved by using properly configured sequences of multiple GTI cavities. From the description given earlier, it is clear that when stacking with a single GTI cavity the last "switching" pulse should have its energy comparable to the energy stored in the cavity. However, by arranging multiple GTI cavities in a sequence (or cascade), as shown in FIG. 16A, it is possible to overcome this limitation, and to achieve stacking with an input-pulse burst containing multiple equal-amplitude pulses. We can show this by extending the earlier presented theoretical analysis for a single GTI. Let's use the same notation for cavity parameters and field amplitudes, but add subscripts indicating the corresponding cavity in a sequence, as shown in FIG. 16A. Then Eq. (5) can be rewritten to describe the interference in the $k^{th}$ cavity, occurring between the input, output and circulating fields for the $n^{th}$ input pulse as following:

$$\begin{bmatrix} {}^{out}_k \tilde{A}_n \\ {}^{cav}_k \tilde{A}_{n-1} \end{bmatrix} = \begin{bmatrix} 1 & 0 \\ 0 & \alpha_k e^{i\delta_k} \end{bmatrix} \begin{bmatrix} r_k & it_k \\ it_k & r_k \end{bmatrix} \begin{bmatrix} {}^{out}_{k-1} \tilde{A}_n \\ {}^{cav}_k \tilde{A}_n \end{bmatrix}. \quad (20)$$

Note that now the output field from each cavity becomes the input field for the next cavity in the sequence ${}^{out}_{k-1}\tilde{A}_n = {}^{in}_k \tilde{A}_n$. This leads to the following set of equations, which are analogous to Eq. (6) and Eq. (7) from above for the semi-infinite input pulse train case when there are m cavities:

$$\begin{bmatrix} 1 \\ 0 \end{bmatrix} = \begin{bmatrix} 1 & 0 \\ 0 & \alpha_m e^{i\delta_m} \end{bmatrix} \begin{bmatrix} r_m & it_m \\ it_m & r_m \end{bmatrix} \begin{bmatrix} {}^{out}_{m-1}\tilde{A}_0 \\ {}^{cav}_m \tilde{A}_0 \end{bmatrix}, \text{ for } n=0 \text{ and} \quad (21)$$

$$k = m$$

$$\begin{bmatrix} {}^{out}_k \tilde{A}_0 \\ 0 \end{bmatrix} = \begin{bmatrix} 1 & 0 \\ 0 & \alpha_k e^{i\delta_k} \end{bmatrix} \begin{bmatrix} r_k & it_k \\ it_k & r_k \end{bmatrix} \begin{bmatrix} {}^{out}_{k-1}\tilde{A}_0 \\ {}^{cav}_k \tilde{A}_0 \end{bmatrix}, \text{ for } n=0 \text{ and} \quad (22)$$

$$k = 2, 3, \ldots m-1$$

$$\begin{bmatrix} {}^{out}_1 \tilde{A}_n \\ 0 \end{bmatrix} = \begin{bmatrix} 1 & 0 \\ 0 & \alpha_1 e^{i\delta_1} \end{bmatrix} \begin{bmatrix} r_1 & it_1 \\ it_1 & r_1 \end{bmatrix} \begin{bmatrix} {}^{in}_1 \tilde{A}_0 \\ {}^{cav}_1 \tilde{A}_0 \end{bmatrix}, \text{ for } n=0 \text{ and} \quad (23)$$

$$k = 1$$

$$\begin{bmatrix} 0 \\ {}^{cav}_m \tilde{A}_{n-1} \end{bmatrix} = \begin{bmatrix} 1 & 0 \\ 0 & \alpha_m e^{i\delta_m} \end{bmatrix} \begin{bmatrix} r_m & it_m \\ it_m & r_m \end{bmatrix} \begin{bmatrix} {}^{in}_{m-1}\tilde{A}_n \\ {}^{cav}_m \tilde{A}_n \end{bmatrix}, \quad (24)$$

for $n = 1, 2, \ldots \infty$ and $k = m$ $$\begin{bmatrix} {}^{out}_k \tilde{A}_n \\ {}^{cav}_k \tilde{A}_{n-1} \end{bmatrix} = \begin{bmatrix} 1 & 0 \\ 0 & \alpha_k e^{i\delta_k} \end{bmatrix} \begin{bmatrix} r_k & it_k \\ it_k & r_k \end{bmatrix} \begin{bmatrix} {}^{out}_{k-1}\tilde{A}_n \\ {}^{cav}_k \tilde{A}_n \end{bmatrix}, \quad (25)$$

for $n = 1, 2, \ldots \infty$ and $k = 2, 3, \ldots m-1$ $$\begin{bmatrix} {}^{out}_1 \tilde{A}_n \\ {}^{cav}_1 \tilde{A}_{n-1} \end{bmatrix} = \begin{bmatrix} 1 & 0 \\ 0 & \alpha_1 e^{i\delta_1} \end{bmatrix} \begin{bmatrix} r_1 & it_1 \\ it_1 & r_1 \end{bmatrix} \begin{bmatrix} {}^{in}_1 \tilde{A}_n \\ {}^{cav}_1 \tilde{A}_n \end{bmatrix}, \quad (26)$$

for $n = 1, 2, \ldots \infty$ and $k = 1$

For each incident pulse $n \geq 0$ there are 2m algebraic equations, which completely define all 2m fields ${}^{in}_k \tilde{A}_n$ and ${}^{cav}_k \tilde{A}_n$ (k=1, m) present for that incident pulse in all m cavities, each as a function of front-mirror reflectivities $r_1$, $r_2$, ..., $r_m r_1$, $r_2$, ..., $r_m$, round-trip phases $\delta_1$, $\delta_2$, ..., $\delta_m$ of all GTI cavities in the sequence, and the pulse number n. We are interested only in the input-field amplitudes into the first GTI cavity ${}^{in}_1 \tilde{A}_n$, each defined by 2m independent parameters $r_1, r_2, \ldots, r_m$ and $\delta_1, \delta_2, \ldots, \delta_m$. Consequently, we can choose to write 2m-1 equations $|{}^{in}_1\tilde{A}_n|^2 = |{}^{in}_1\tilde{A}_{n-1}|^2$ for $n=0, 1, \ldots, 2m-1$, which set the condition for all peak-intensities of the last 2m pulses in the incident pulse burst to be equal among each other. This means that pulse burst with 2m equal-amplitude pulses can be stacked in a sequence of GTI cavities with m reflectivities $r_1, r_2, \ldots, r_m$, and m-1 round-trip phases $\delta_1, \delta_2, \ldots, \delta_{m-1}$ defined by solving these 2m-1 equations. One of the round-trip phases (for example $\delta_m$) can be freely selected, and only affects the required individual-pulse phases of the input stacking-pulse burst.

Figure 17A:
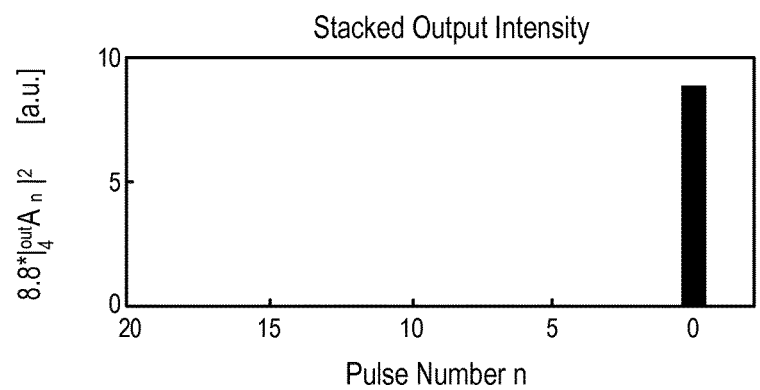
FIGS. 17A-17C are graphs depicting calculated intensities and phases of input pulse bursts and output pulse intensities of four cascaded cavities.
Figure 17B:
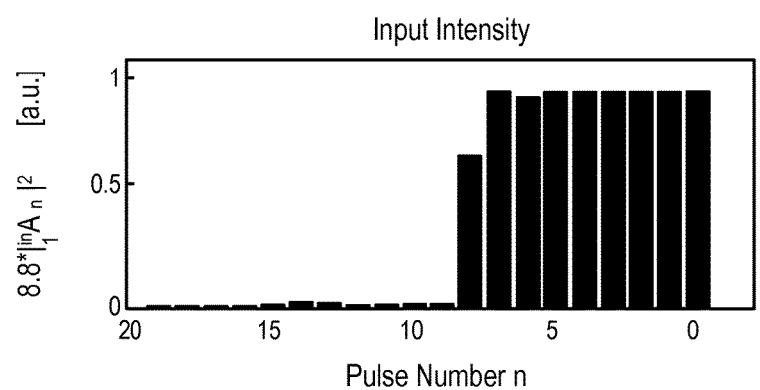
Figure 17C:
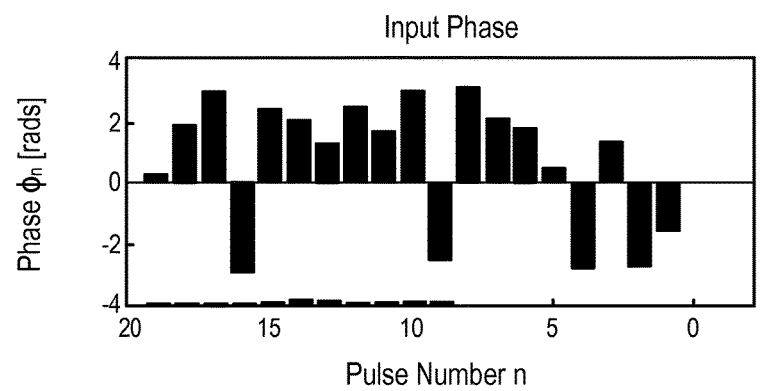

Calculated example for the case of 4 cascaded cavities and the semi-infinite pulse train is presented in FIGS. 17A-17C, showing stacking sequence consisting of eight equal-amplitude pulses with a numerical stacking factor close to 9, since the n=8 pulse in the burst has its peak intensity nearly equal to those of the last eight pulses. The calculated GTI-cascade parameters $R_k=|r_k|^2$ and $\delta_k$ are as follows: $R_1$=0.535, $R_2$=0.526, $R_3$=0.618, $R_4$=0.666, $\delta_1$=4.66, $\delta_2$=3.15, $\delta_3$=5.46, $R_1$=0.535, $R_2$=0.526, $R_3$=0.618, $R_4$=0.666, $\delta_1$=4.66, $\delta_2$=3.15, $\delta_3$=5.46, and we chose $\delta_4$=0. Note that in reality this semi-infinite stacking-pulse train can be truncated to a finite pulse burst, just as in the single-GTI configuration.

Figure 16B:
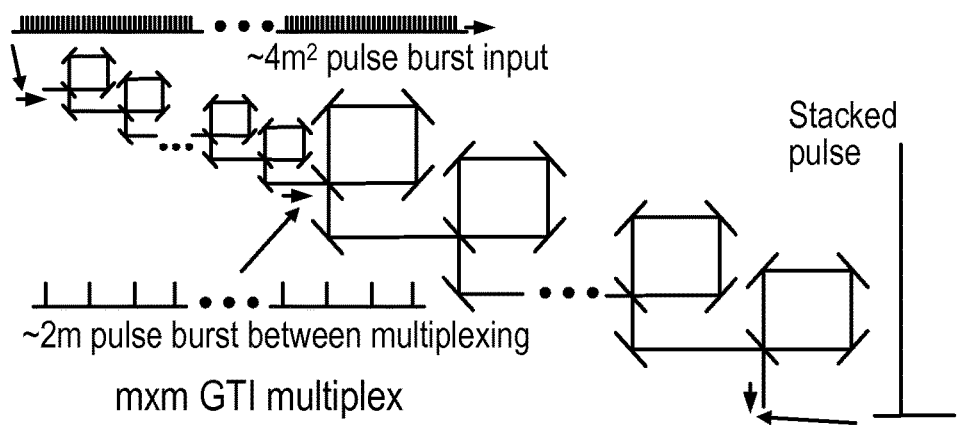
FIG. 16B is a diagram illustrating m×m multiplexed different-roundtrip GTI cavities.
Figure 18A:
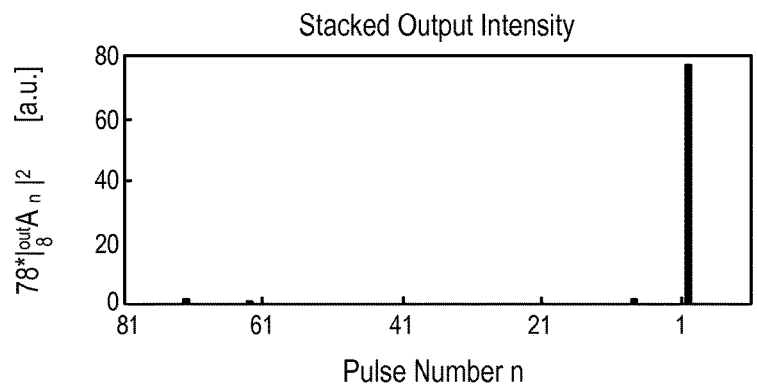
FIGS. 18A-18C are graphs depicting calculated intensities and phases of input pulse bursts and output pulse intensities of four-by-four multiplexed cavities.
Figure 18B:
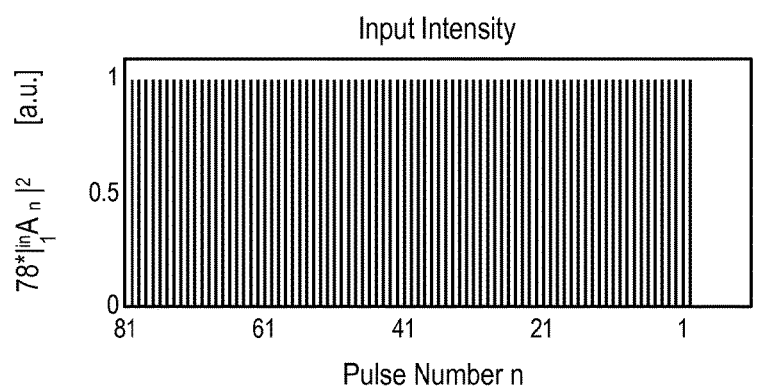
Figure 18C:
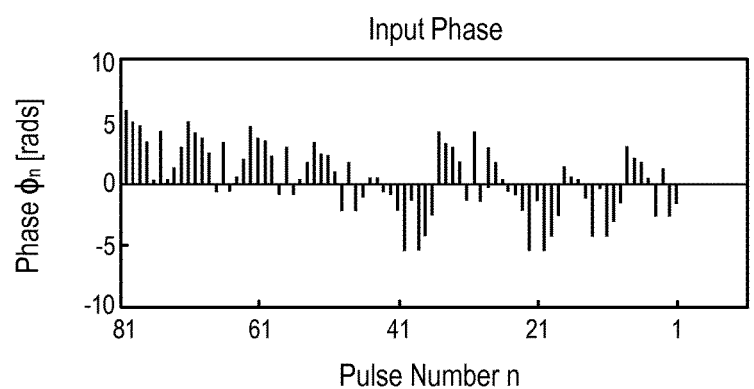

Cascaded equal-roundtrip GTI cavities provide multiple-pulse stacking proportional to the number of GTI cavities. It is possible to achieve a substantially quicker increase in stacking factors by using a multiplexed GTI cavity configuration shown in FIG. 16B. This configuration essentially multiplexes a cascade of m equal-roundtrip GTI cavities with an identical cascade of m GTI cavities, but with the second cascade round-trip being more than 2m times longer than that of the first cascade. Numerically calculated example for the case of 4×4 multiplexed cavities and the finite input-pulse consisting of 81 equal-amplitude pulses is shown in FIGS. 18A-18C using the same GTI front mirror reflectivities and cavity round-trip phases as in the previous example of 4 cascaded cavities. It shows that using multi-plexing of eight GTI cavities one can achieve stacked peak-power enhancement close to 80.

Figure 12:
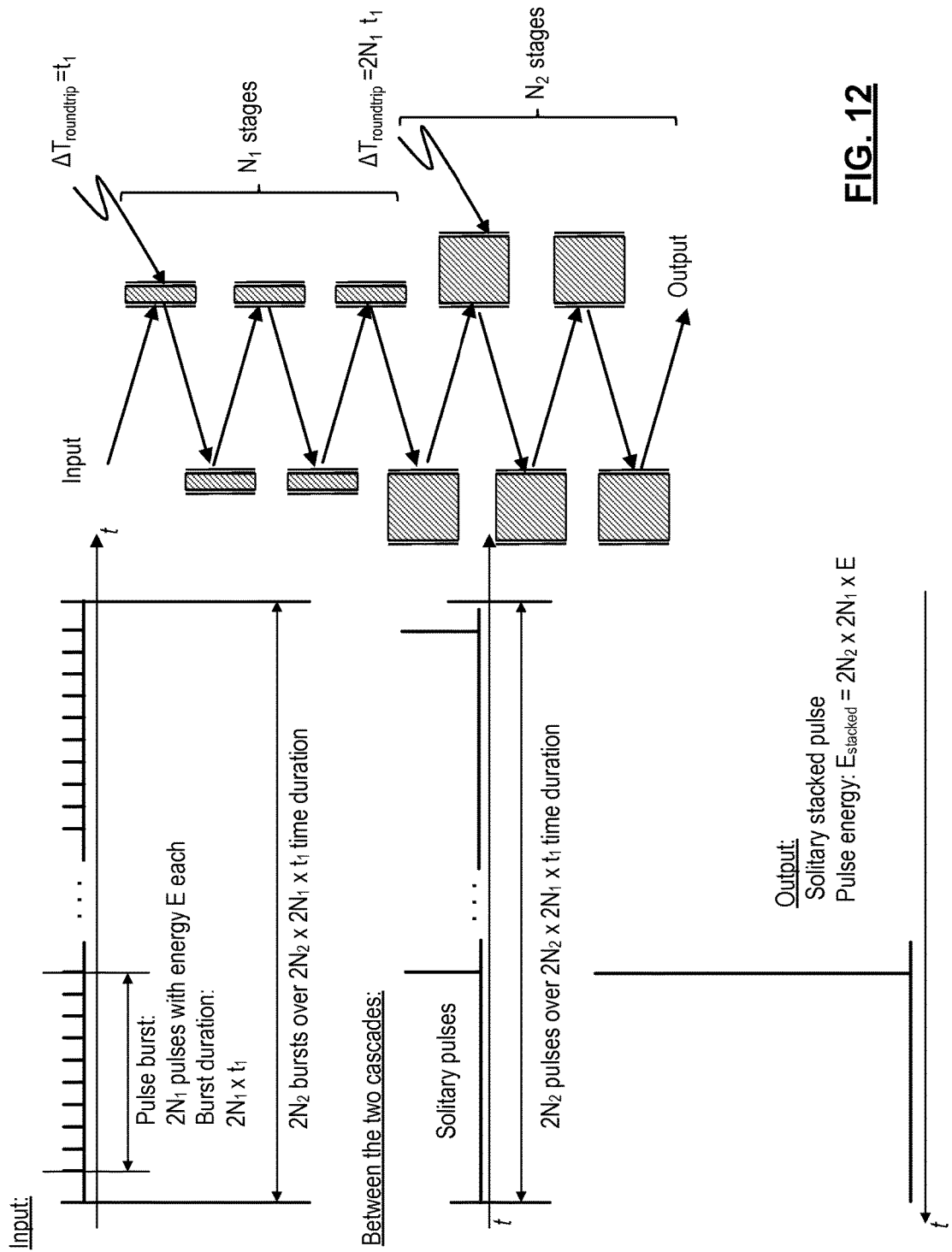
FIG. 12 is a diagram depicting an arrangement for a pulse-burst stacker having two cascaded stages.

This multiplexed cascaded scheme can be generalized to the scheme shown in FIG. 12, where the multiplexed sequential cascades contain different number of GTI elements, not just the equal number as described above. The scheme employs two or more stages, each stage comprised of a sequentially cascaded resonant cavities. In this example, a first stage is comprised of $N_1$ resonant cavities and a second state is comprised of $N_2$ resonant cavities. These two different stages are distinguished from each other by the fact that the round trip time for all RC cavities in the first cascade is $t_1$, whereas, the round trip time for all RC cavities in the second cascade is $2N_1 t_1$. The input signal now consists of $2N_2$ bursts, each burst consisting of $2N_1$ pulses. The $2N_1$ pulses in each burst are configured in such a way that each burst is stacked into a single pulse at the output of the first cascade. Consequently, at the output of the first cascade, a sequence of $2N_2$ pulses is produced. The sequence is configured in such a way (by choosing the suitable phase of each individual pulse-burst in the initial sequence) that the two solitary pulses are in turn stacked again in the second cascade to form an output with a single pulse. Assuming that the equal amplitude pulse format as shown in FIG. 11 is used here the total energy in the stacked pulse is $E_{stacked}=2N_2 \times 2N_1 \times E_{individual}$. Essentially this represents a quadratic increase with a total number of combining cavities in the cascade. The two stage scheme is merely exemplary as there can be more than two cascades or stages in the sequence.

Figure 13:
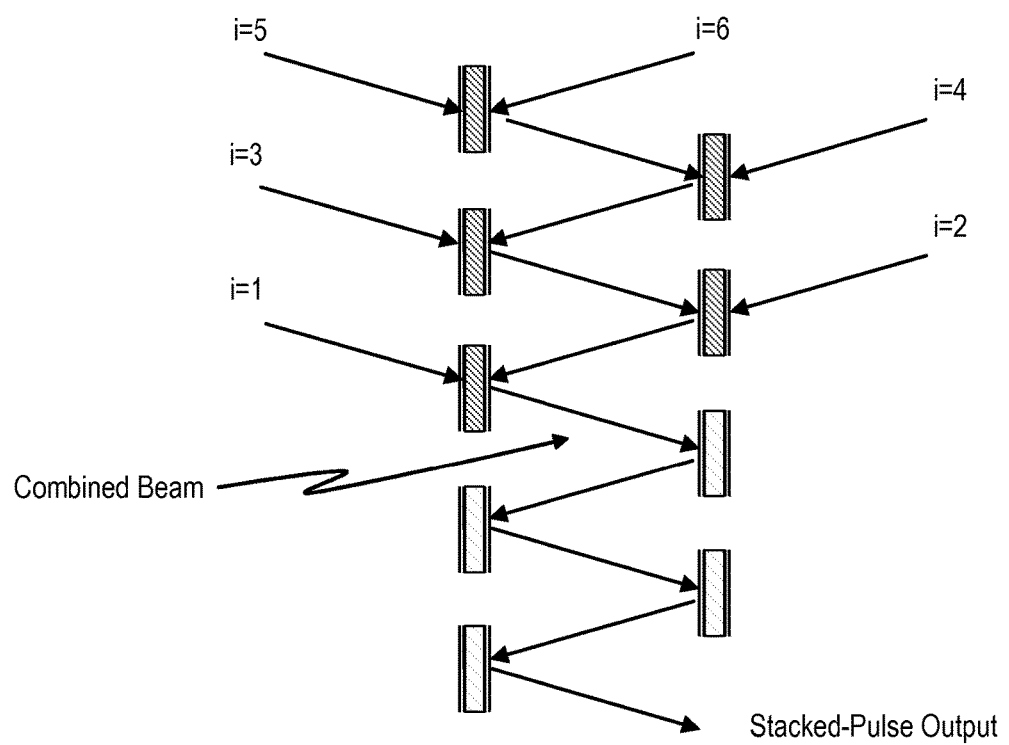
FIG. 13 is a diagram depicting another arrangement for a pulse-burst stacker having two cascaded stages.

Signal combining (both spatially and temporally) partially-reflecting resonator cavities and completely-reflecting resonator cavities (temporally combining) can be combined as shown in FIG. 13. Such a configuration represents a general beam combining and pulse stacking arrangement shown in FIG. 3. Note that this is merely an example and different variations of the configuration could be used as well. For example, the parallel cascade can replace the sequential cascade of Fabry-Perot type cavities.

An additional advantageous mode of implementing these techniques is as follows. This pertains to the configuration consisting of a periodic pulse source, from which the required pulse burst is "carved out" using an amplitude and a phase modulators, of an amplifier, and of the Gires-Tournois based pulse combiner. In the prior art there is a technique known as divided pulse amplification (DPA) where solitary pulses from a signal source are first split into a number of pulse replicas using a sequence of optical delay lines, amplified, and then reconstituted back into a solitary pulse using an identical setup of optical delay lines. There is a significant practical advantage of replacing optical delay line pulse splitter in this DPA scheme with the periodic pulse source followed by an amplitude and a phase modulators, as described in this disclosure. With a suitable modulation of amplitudes and phases in the generated pulse burst it could reproduce the effect of the optical delay-line spatial arrangement. But this could be implemented in a much more compact, monolithic in the practice, arrangement, compared to a cumbersome arrangement of spatial delay lines.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for coherently combining pulses of a pulsed optical signal in the time domain, comprising:
   receiving an optical input signal comprised of a periodic pulse train;
   splitting the input signal into two optical signals;
   forming at least one cluster of pulses in each of the two optical signals, where amplitude and phase of pulses in each cluster varies amongst pulses; and
   coherently combining the two optical signals in the time domain using a resonant cavity and thereby forming an optical output signal having a solitary pulse for each cluster of pulses, where the two optical signals are combined in a manner such that pulse energy of the solitary pulse exceeds two times highest energy of any given pulse in the cluster of pulses from the two optical signals.

2. The method of claim 1 wherein forming at least one cluster of pulses further comprises amplitude modulating the two optical signals and phase modulating the two optical signals.

3. The method of claim 1 further comprises forming at least one cluster of pulses so that clusters of pulses in the two optical signals are complementary with each other in the spectral domain.

4. The method of claim 1 further comprises coherently combining the two optical signals using a Fabry-Perot interferometer.

5. A method for coherently combining pulses of a pulsed optical signal in the time domain, comprising:
   receiving an optical input signal comprised of a periodic pulse train;
   splitting the input signal into N optical signals;

amplitude modulating each signal in the N optical signals to form clusters of pulses in each signal, such that amplitude of pulses in each cluster varies amongst pulses;

phase modulating each signal in the N optical signals, such that phase of pulses in each cluster varies amongst pulses; and coherently combining each of the phase modulated signals in the time domain using one or more resonant cavities and thereby forming an optical output signal having a solitary pulse for each cluster of pulses, where the N optical signals are combined in a manner such that pulse energy of the solitary pulse exceeds N times highest energy of any given pulse in the cluster of pulses from the N optical signals.

6. The method of claim 5 further comprises amplifying each of the phase modulated signals prior to coherently combining the phase modulated signals.

7. The method of claim 5 further comprises phase locking each of the N optical signals.

8. The method of claim 5 further comprises coherently combining each of the phase modulated signals using a plurality of Fabry-Perot interferometer cavities.

9. The method of claim 8 further comprises arranging the plurality of Fabry-Perot interferometers in a parallel cascading manner.

10. The method of claim 8 further comprises arranging the plurality of Fabry-Perot interferometers in a sequential cascading manner.

11. A method for coherently combining pulses of a pulsed optical signal in the time domain, comprising:

receiving an optical input signal comprised of a periodic pulse train;

forming at least one cluster of pulses in the pulse train, where amplitude and phase of pulses in the at least one cluster varies amongst pulses; and coherently combining pulses in the at least one cluster in the time domain to form an optical signal with a solitary pulse using a resonant cavity, where the resonant cavity has an entirely reflective cavity.

12. The method of claim 11 wherein forming at least one cluster of pulses further comprises amplitude modulating the optical input signal and phase modulating the optical input.

13. The method of claim 11 further comprises coherently combining pulses using a Gires-Tournois interferometer cavity.

14. A method for coherently combining pulses of a pulsed optical signal in the time domain, comprising:

receiving an optical input signal comprised of a periodic pulse train;

amplitude modulating the optical input signal to form at least one clusters of pulses, such that amplitude of pulses in each cluster varies amongst pulses;

phase modulating the optical input signal, such that phase of pulses in each cluster varies amongst pulses;

splitting the optical input signal into N optical signals;

amplifying each of the N optical signals;

coherently combining each of the amplified optical signals into a combined signal using a beam combiner; and coherently combining pulses in the at least one cluster of pulses in the combined signal in the time domain using a resonant cavity having an entirely reflective cavity, thereby forming an optical output signal having a solitary pulse for each cluster of pulses.

15. The method of claim 14 further comprises phase locking each signal of the N optical signals.

16. The method of claim 14 further comprises coherently combining pulses in each cluster of pulses using a Gires-Tournois interferometer.

17. The method of claim 16 further comprises coherently combining pulses using N Gires-Tournois interferometers arranged in a sequential cascading manner, such that the energy increase of a solitary pulse is approximately 2N.

18. The method of claim 16 further comprises coherently combining pulses using a plurality of Gires-Tournois interferometers arranged in two or more sequential stages, where each stage includes N Gires-Tournois interferometers arranged in a sequential cascading manner, where the Gires-Tournois interferometer in each subsequent cascade are of equal roundtrip length, which is at least 2N times longer than in the previous cascade.

* * * * *